US011165170B2

(12) United States Patent
Kossin

(10) Patent No.: US 11,165,170 B2
(45) Date of Patent: Nov. 2, 2021

(54) TRIAXIAL ANTENNA RECEPTION AND TRANSMISSION

(71) Applicant: Eagle Technology, LLC, Melbourne, FL (US)

(72) Inventor: Philip Kossin, Clifton, NJ (US)

(73) Assignee: Eagle Technology, LLC, Melbourne, FL (US)

( * ) Notice: Subject to any disclaimer, the term of this patent is extended or adjusted under 35 U.S.C. 154(b) by 548 days.

(21) Appl. No.: 16/189,349

(22) Filed: Nov. 13, 2018

(65) Prior Publication Data

US 2020/0153119 A1 May 14, 2020

(51) Int. Cl.

| | |
|---|---|
| ***H01Q 21/24*** | (2006.01) |
| ***H01Q 15/24*** | (2006.01) |
| ***H01Q 3/26*** | (2006.01) |
| ***H04B 7/10*** | (2017.01) |
| ***H01Q 9/04*** | (2006.01) |

(52) U.S. Cl.

CPC ........... *H01Q 21/24* (2013.01); *H01Q 3/2605* (2013.01); *H01Q 3/2617* (2013.01); *H01Q 9/0428* (2013.01); *H01Q 15/246* (2013.01)

(58) Field of Classification Search

CPC .......... H01Q 21/24; H01Q 3/242; H01Q 3/26; H01Q 3/2605; H01Q 3/2617; H01Q 15/24; H01Q 15/246; H01Q 15/242; H01Q 21/205; H04B 7/10

See application file for complete search history.

(56) References Cited

U.S. PATENT DOCUMENTS

| | | | | |
|---|---|---|---|---|
| 6,292,134 | B1 | 9/2001 | Bondyopadhyay | |
| 6,317,098 | B1 | 11/2001 | Andrews et al. | |
| 7,113,748 | B2 * | 9/2006 | Shapira | H01Q 1/246 342/361 |
| 7,505,009 | B2 | 3/2009 | Parsche et al. | |
| 8,559,888 | B2 * | 10/2013 | Li | H01Q 3/26 455/67.16 |
| 8,743,015 | B1 | 6/2014 | West et al. | |

(Continued)

OTHER PUBLICATIONS

Berg, M., et al., "Circularly Polarized GPS Antenna for Simultaneous LHCP and RHCP Reception with High Isolation," Loughborough Antennas & Propagation Conference (LAPC), pp. 1-4 (Nov. 2016).

(Continued)

*Primary Examiner* — Blane J Jackson

(74) *Attorney, Agent, or Firm* — Edell, Shapiro & Finnan, LLC

(57) ABSTRACT

An apparatus comprises: a triaxial antenna including orthogonal x, y, and z linearly polarized elements to convert RF energy to x, y, and z RF signals; converters to convert the x, y, and z RF signals to x, y, and z complex signals, respectively; a polarization generator to rotate x, y, and z axes of the x, y, and z complex signals angularly responsive to angle signals, apply x, y, and z complex weights to the x, y, and z complex signals to produce x, y, and z controlled complex signals, respectively, and sum the x, y, and z controlled complex signals into a combined signal, such that the x, y, and z complex weights apply a polarization to the RF energy as manifested in the combined signal, and the angle signals rotate a plane of the polarization relative to the x, y, and z axes, without moving the triaxial antenna.

20 Claims, 18 Drawing Sheets

(56) References Cited

U.S. PATENT DOCUMENTS

| | | | | |
|---|---|---|---|---|
| 8,954,023 | B2 | 2/2015 | Hillstrom et al. | |
| 9,680,224 | B2 | 6/2017 | Parsche et al. | |
| 2009/0040119 | A1 | 2/2009 | Kawasaki et al. | |
| 2015/0234053 | A1* | 8/2015 | Psiaki | G01S 19/215 342/357.51 |
| 2018/0224557 | A1* | 8/2018 | McMilin | G01S 19/215 |

OTHER PUBLICATIONS

Chapman, D.C., "Space Enterprise Vision and Implications to Robust Satellite Navigation," Presentation, Air Force Research Laboratory (May 2, 2017).

Compton Jr., R.T., "The Tripole Antenna: An Adaptive Array with Full Polarization Flexibility," IEEE Transactions on Antennas and Propagation, vol. AP-29(6), pp. 944-952 (Nov. 1981).

Compton Jr., R.T., "The Performance of a Tripole Adaptive Array Against Cross-Polarized Jamming," IEEE Transactions on Antennas and Propagation, vol. AP-31(4), pp. 682-685 (Jul. 1983).

Egea-Roca, D., et al., "GNSS Measurement Exclusion and Weighing with a Dual Polarized Antenna: The Fantastic Project," 2018 8th International Conference on Localization and GNSS (ICL-GNSS), Guimarães, Portugal, pp. 1-6 (Jun. 2018).

Haupt, R., "Adaptive Crossed Dipole Antennas Using a Genetic Algorithm," IEEE Transactions on Antennas and Propagation, vol. 52(8), pp. 1976-1982 (Aug. 2004).

Yang, C., Alec P., "GPS Multipath Estimation and Mitigation via Polarization Sensing Diversity: Parallel Iterative Cross Cancellation," Proceedings of the 18th International Technical Meeting of the Satellite Division of The Institute of Navigation (ION GNSS 2005), pp. 2707-2719 (Sep. 2005).

Slade, B., "The Basics of Quadrifilar Helix Antennas,", Orbanmicrowave Products, www.obranmicrowave.com (2015).

Schmidt, R.O., "Multiple Emitter Location and Signal Parameter Estimation," IEEE Transactions on Antennas and Propagation, vol. AP-34(3), pp. 276-280 (Mar. 1986).

* cited by examiner

TRIAXIAL ANTENNA RECEPTION AND TRANSMISSION

TECHNICAL FIELD

The present disclosure relates to directional polarization and nulling control in triaxial antenna reception and transmission.

BACKGROUND

Global Navigation Satellite System (GNSS), such as the Global Positioning system (GPS), Galileo, and the like, which broadcast radio frequency (RF) energy from a spacecraft platform, or alternatively an airborne or terrestrial platform, are susceptible to degradation due to multipath, intentional or unintentional interference from jammers or other sources. These systems are also susceptible to "spoofing," i.e., unauthorized transmitters which send falsified GNSS-like signals with the intent to give the user erroneous position, navigation, or timing estimates.

Conventional GPS receive antennas suffer from axial ratio (AR) limitations, which play out in the following ways. Jammer rejection using a known jammer excision algorithm depends on cross-polarization isolation, which is a function of the axial ratio. GPS receive/transmit phased arrays typically include one or more circular polarized elements pointed at zenith (e.g., in the vertical direction) arranged in a planar antenna array. These elements may include helical elements, x-y dipoles, or patch elements, which produce circular polarization (CP) in a plane, so that true right-hand (RH) CP (RHCP) or left-hand (LH) CP (LHCP) is only in the boresight (e.g., z) direction. Thus, as an antenna scan angle theta increases from boresight (where theta=0°), the axial ratio of these antennas degrade. At the horizon (where theta=90°), the planar antenna array is essentially linearly polarized and can no longer resolve or control its polarization. Therefore, it is not possible for such antennas to accurately control receive (RX)/transmit (TX) polarization over a three-dimensional (3D) volume. Additionally, conventional two-dimensional (2D) antenna arrays and dual polarization receivers are limited in their abilities to determine direction of arrival and to characterize polarization of signals, which in turn limits their abilities to identify spoofers and to separate jammer energy from desired signal energy.

Conventional space-based phased arrays are designed to form an antenna beam in one primary direction, e.g., toward the Earth or a space vehicle. Networked satellites rely on antenna technology that can work equally well in all directions. Current space-based phased array technology is not well suited to beamforming controlled polarization in all directions in 3D space. Conventional phased arrays are designed to optimize their axial ratio in one direction, i.e., in the boresight direction. As the beam is electronically steered off-boresight, at increased scan angles, the axial ratio degrades. These arrays cannot form an accurately controlled, polarized beam in all directions. Prior solutions to this problem cover a sphere or other solid shape with outward facing elements, which leads to inefficient use of the array elements as elements on only one side of the sphere are in play at any given time.

DESCRIPTION OF EXAMPLE EMBODIMENTS

Overview

Figure 1A:
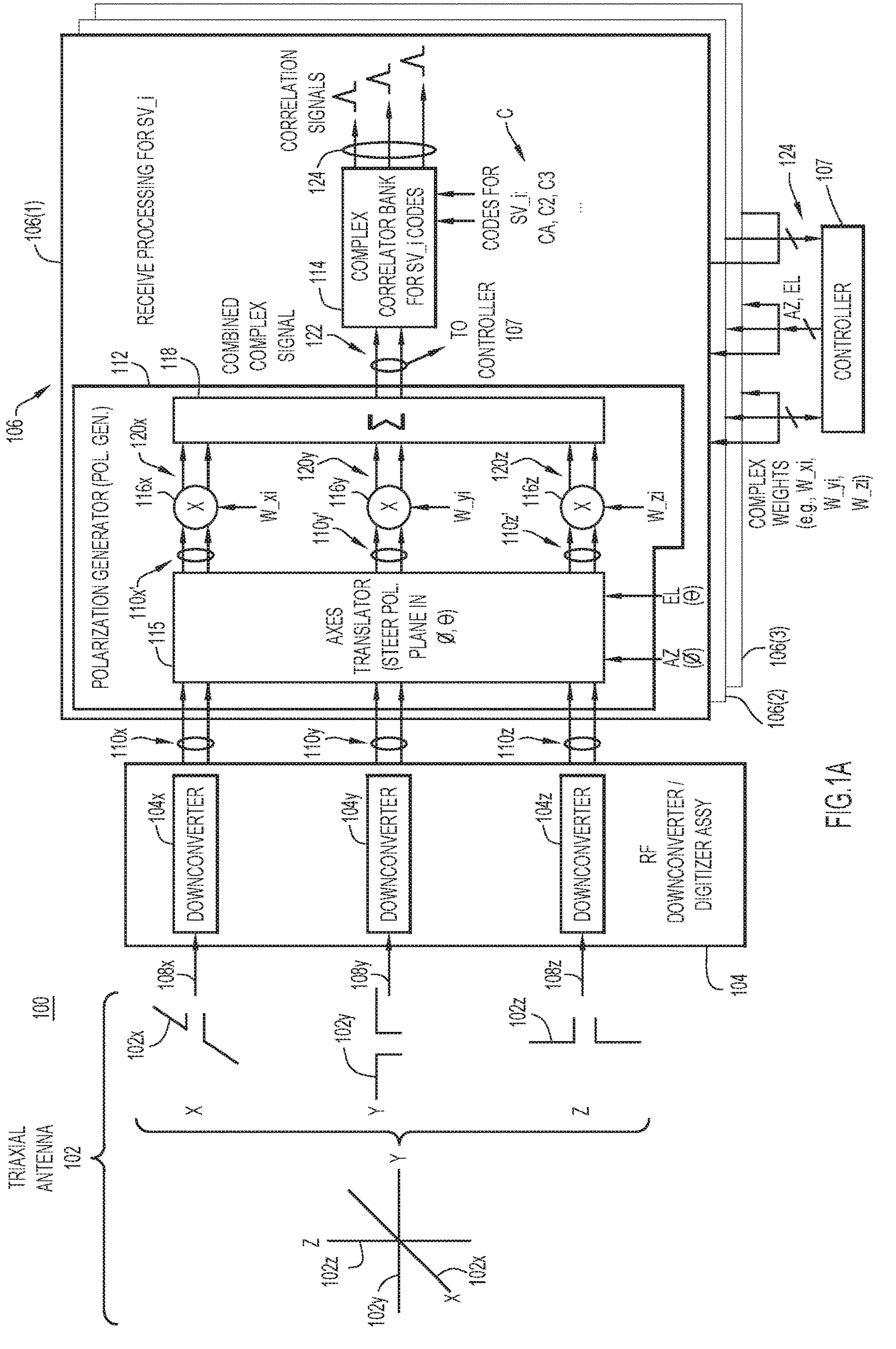
FIG. 1A is a block diagram of an example receive system that applies complex weights and angle signals to 3D/triaxial signals from a triaxial antenna to control receive polarization and to steer a direction of the polarization.

An embodiment directed to triaxial receive processing includes an apparatus comprising: a triaxial antenna including orthogonal x, y, and z linearly polarized elements configured to convert radio frequency (RF) energy to x, y, and z RF signals, respectively; converters to convert the x, y, and z RF signals to x, y, and z complex signals referenced to x, y, and z axes, respectively; a polarization generator to rotate the x, y, and z axes of the x, y, and z complex signals angularly responsive to angle signals, apply x, y, and z complex weights to the x, y, and z complex signals to produce x, y, and z controlled complex signals referenced to the x, y, and z axes as rotated, respectively, and sum the x, y, and z controlled complex signals into a combined signal, such that the x, y, and z complex weights apply a polarization to the RF energy as manifested in the combined signal, and the angle signals rotate a plane of the polarization relative to the x, y, and z axes, without moving the triaxial antenna.

Example Embodiments

Embodiments presented herein overcome the above-mentioned problems, disadvantages, and challenges. The embodiments result in GNSSs that are robust and resilient to multipath, jamming, and spoofing, while minimizing the size, weight, RF and direct current (DC) power required of the GNSS system, whether receiver or transmitter. The embodiments receive or transmit RF energy using at least one triaxial antenna having orthogonal linearly polarized elements, and apply complex weights to triaxial signals associated with the linearly polarized elements to create a particular antenna polarization, control a direction of the polarization 3D space, and create antenna pattern nulls.

Receive embodiments enable 3D resolution of incoming polarization from any direction without typical degradation in axial ratio, and provide direction of arrival (DOA) in azimuth and elevation. The receive embodiments enable new, advantageous algorithms for jammer cancellation and spoofer detection, and for DOA determination. Transmit embodiments enable a new signaling concept referred to as "spatial modulation." In spatial modulation, x, y, and z complex vectors are independently modulated with information such that a time-varying, direction-varying polarized signal is transmitted. Many of the embodiments are described in the context of GNSS by way of example, only. It is understood that the embodiments apply generally to any system that employs one or more triaxial antennas.

As used herein, the descriptors x, y, and z are used as general/generic labels synonymous with labels such as first, second, and third, respectively, (1), (2), and (3), respectively, and so on unless more specifically defined. The combination of labels "x, y, and z" as applied to signals/weights is synonymous with and may be replaced by the singular label "3D." Additionally, the term "triaxial" as applied to signals/weights (e.g., "triaxial signals a, b, and c") is synonymous and interchangeable with the term "3D" as applied to the signals/weights (e.g., "3D signals a, b, and c").

Triaxial Receive Processing

Various triaxial receive processing embodiments are described below in connection with FIGS. 1A-6B.

With reference to FIG. 1A, there is a block diagram of an example receive system 100 that uses complex weights and angle signals to control receive polarization in order to implement the above mentioned receive embodiments. In the example of FIG. 1A, receive system 100 receives and processes GPS signals from multiple GPS satellites in parallel. Receive system 100 includes a triaxial antenna 102, an RF downconverter/digitizer assembly 104 coupled to the triaxial antenna, parallel receive processors 106(1)-106(3) (collectively referred to as receive processors 106) coupled to the RF downconverter/digitizer assembly, and a controller 107 coupled to the receive processors. Triaxial antenna 102 includes 3D dipoles **102*x*, 102*y*, and 102*z* (referred to simply as x, y, and z dipoles, respectively) having a common phase center and arranged along x, y, and z orthogonal axes. In other words, triaxial antenna includes orthogonal dipoles 102*x*, 102*y*, and 102*z*. Dipoles 102*x*, 102*y*, and 102*z* receive radiant RF energy, which may or may not be polarized, and convert the RF energy to triaxial (i.e., "3D") RF signals 108*x*, 108*y*, and 108*z*, respectively (referred to simply as x, y, and z RF signals). Dipoles 102*x*, 102*y*, and 102*z* feed their respective RF signals 108*x*, 108*y*, and 108*z* to RF down-converter/digitizer assembly 104**.

By way of example only, the embodiments presented herein describe the triaxial antenna as including orthogonal dipoles. It is understood that, more generally, the embodiments may employ one or more triaxial antennas that each include orthogonal x, y, and z (i.e., 3D) linearly polarized elements. Examples of linearly polarized elements include, but are not limited to, monopoles, dipoles, patch antennas, circular loops, and the like, configured to transmit and receive linearly polarized energy. In an embodiment, the orthogonal linearly polarized elements of the triaxial antenna have a common phase center, e.g., based on construction of the triaxial antenna. In another embodiment, the orthogonal linearly polarized elements are not constructed to have a common phase center, in which case transmit/receive signals associated with the elements are processed to create the common phase center.

RF down-converter/digitizer assembly 104 includes RF downconverters/digitizers **104*x*, 104*y*, and 104*z* (referred to simply as x, y, and z "downconverters" or x, y, and z "converters") having inputs to receive RF signals 108*x*, 108*y*, and 108*z* from dipoles 102*x*, 102*y*, and 102*z*, respectively. RF downconverters 104*x*, 104*y*, and 104*z* frequency-downconvert and then digitize RF signals 108*x*, 108*y*, and 108*z*, to produce triaxial (3D), digitized, baseband, complex (i.e., quadrature I, Q) signals 110*x*, 110*y*, and 110*z*, respectively (also referred to simply as (triaxial) complex signals 110*x*, 110*y*, and 110*z*, and also as x, y, and z complex signals). Typically, each RF downconverter includes, in sequence, a low noise amplifier, one or more quadrature frequency mixers, a bandpass filter, and a complex digitizer (i.e., a complex analog-to-digital (A/D)) converter to generate digitized complex signals from analog complex (i.e., I, Q) signals, as would be appreciated by one of ordinary skill in the relevant arts. RF downconverters 104*x*, 104*y*, and 104*z* feed complex signals 110*x*, 110*y*, and 110*z* to each of receive processors 106(1)-106(3)**.

Receive processors 106(1)-106(3) perform receive signal processing associated with corresponding space vehicles (SVs) (e.g., GPS satellites) identified with identifiers SV_1-SV_3. Receive processors 106(1)-106(3) perform their respective receive signal processing on complex signals **110*x*, 110*y*, and 110*z* in parallel, or sequentially in another example, and are configured and operate similarly to each other. Accordingly, the ensuing description of receive processor 106(1) suffices for the other receive processors. For purposes of generality, FIG. 1A also denotes receive processor 106(1) as receive processor 106(*i*) to process signals associated with space vehicle SV_i, as described below. Receive processor 106(*i*) performs receive signal processing associated with space vehicle SV_i. Receive processor 106(*i*) includes a polarization generator 112 (also referred to as a "polarization detector" for reasons that will become apparent from the ensuring description) followed by a complex correlator bank 114. Polarization generator 112 includes an axes translator 115, complex multipliers 116*x*, 116*y*, and 116*z* (referred to simply as x, y, and z complex multipliers) fed by outputs of the axes translator, and a summer 118 fed by outputs of the complex multipliers. An example complex multiplier is described below in connection with FIG. 12**.

Axes translator 115 receives complex signals 110*x*, 110*y*, and 110*z* from RF downconverters 104*x*, 104*y*, and 104*z*, and also receives from controller 107 an angle signal AZ to indicate an azimuth rotation angle φ and an angle signal EL to indicate an elevation rotation angle θ. Axes translator 115 angularly translates/rotates the x, y, and z (orthogonal) axes associated/aligned with complex signals 110*x*, 110*y*, and 110*z* in one or more of azimuth φ and elevation θ responsive to angle signals AZ and EL, respectively, to produce 3D axes-translated/rotated complex signals 110*x*', 110*y*', and 110*z*' associated/aligned with rotated 3D x', y', and z' (orthogonal) axes. This may be thought of as a conversion from a first 3D coordinate system to a second 3D coordinate system that is translated/rotated with respect to the first 3D coordinate system. Each complex weight (e.g., W_xi) respectively includes a real weight component (amplitude) Real (W_xi) and an imaginary weight (phase) component Imag (W_xi), i.e., each complex weight=Real (W_xi)+ jImag (W_xi). Complex multipliers 116*x*, 116*y*, and 116*z* apply complex weights W_xi, W_yi, and W_zi to axes-translated complex signals 110*x*', 110*y*', and 110*z*', to produce 3D axes-translated, weighted complex signals 120*x*, 120*y*, and 120*z* (simply referred to as x, y, and z controlled complex signals), respectively. Complex multipliers 116*x*, 116*y*, and 116*z* feed controlled complex signals 120*x*, 120*y*, and 120*z* to summer 118, which sums them into a combined complex signal 122.

As a result of the operations described above, polarization generator 112 (*i*) angularly rotates the x, y, and z axes associated/aligned with complex signals 110*x*, 110*y*, and 110*z* responsive to angle signals AZ and EL, (ii) applies complex weights W_xi, W_yi, and W_zi to complex signal 110*x*, 110*y*, and 110*z* (indirectly, via rotated complex signals 110*x*', 110*y*', and 110*z*' and complex multipliers 116*x*, 116*y*, and 116*z*), resulting in 3D controlled complex signals 120*x*, 120*y*, and 120*z*, and (iii) sums the controlled complex signals into combined complex signal 122 that manifests a polarization based on the complex weights, and for which a plane of the polarization is rotated in accordance with the angle signals AZ and EL. Thus, polarization generator 112 generates polarization and a rotation of a plane of the polarization, as manifested in combined signal 122, responsive to complex weights W_xi, W_yi, and W_zi and rotation signals AZ and EL, respectively.

Summer 118 provides combined complex signal 122 to correlator bank 114 and to controller 107. Correlator bank 114 includes multiple parallel complex correlators (not specifically shown in FIG. 1A) that each receive combined complex signal 122 and a respective one of multiple codes C (e.g., C1, C2, C3, and so on). Each complex correlator correlates combined complex signal 122 against the respective one of codes C, to produce a respective one of correlation signals 124 (only three of which are shown in FIG. 1A). Correlator bank 114 provides correlation signals 124 to controller 107. In another embodiment, the correlator is relocated to each of the outputs of the RF downconverter/digitizer assembly 104.

Controller 107 controls/adjusts complex weights W_xi, W_yi, and W_zi with respect to each other to apply a polarization to the RF energy that is manifested in combined signal 122, as mentioned above. The polarization is among different polarizations (i.e., different types of polarizations) that are possible based on different combinations or sets of the complex weights. In addition, independent of the control of the complex weights, controller 107 controls the angle signals AZ and EL to steer a plane of the polarization (i.e., the polarization plane) in any direction in 3D space, e.g., with respect to the x, y, and z axes, as mentioned above, without physically moving triaxial antenna 102. The different types of polarization that are possible based on different sets of complex weights include linear polarization (LP) and elliptical polarization. Elliptical polarization is a generalized type of polarization that includes both RHCP and LHCP. Thus, complex weights W_xi, W_yi, and W_zi can be said to create a "virtual polarization" associated with a "virtual antenna" corresponding to triaxial antenna 102, while angle signals AZ and EL steer a direction of the virtual polarization.

Thus, controller 107 may set the complex weights to produce LP, and adjust the complex weights to steer or rotate a direction of the LP (i.e., a plane in which the LP lies) in any direction in 3D space. Similarly, controller 107 may set the complex weights to produce RHCP or LHCP, and adjust the angle signals AZ and EL to steer/rotate a polarization plane of the RHCP or the LHCP in any direction in 3D space (e.g., with respect to the x, y, and z axes). Steering the polarization plane in 3D space may be considered as being similar to pointing a normal vector of the polarization plan (e.g., along which the circularly polarized signal travels) in different directions in 3D space, thus causing different tilts in or rotations of the polarization plane.

Figure 1C:
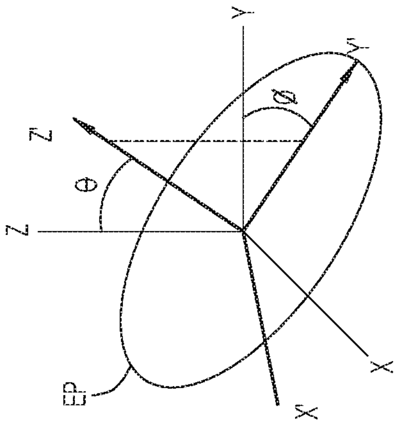
FIG. 1C is an illustration of a plane of elliptical polarization that has been rotated in azimuth and elevation from an initial plane using rotation matrices.
Figure 1B:
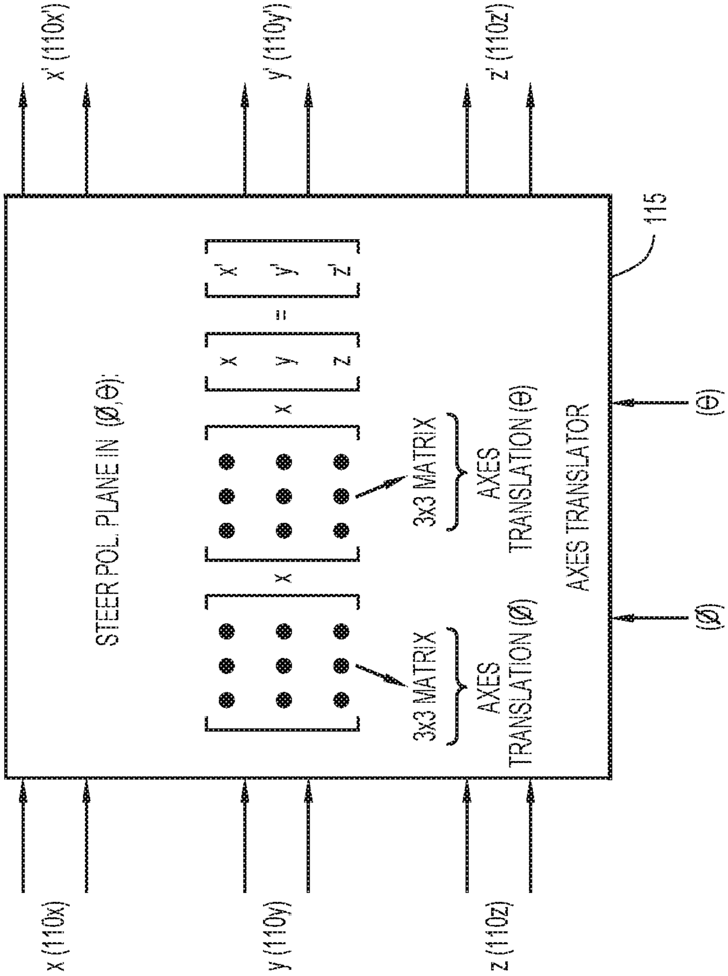
FIG. 1B is an illustration of example operations performed by an axes translator of a polarization generator of the receive system to rotate a plane of polarization.

With reference to FIG. 1B there is an illustration of example operations performed by axes translator 115 to translate/rotate x, y, and z axes associated/aligned with complex signals 110*x*, 110*y*, and 110*z*, to correspondingly rotate a plane of polarization. Axes translator 115 applies to a sample vector of complex signals 110*x*, 110*y*, and 110*z* a first 3×3 rotation matrix to perform a first rotation of the x, y, and z axes in azimuth, and then applies a second 3×3 rotation matrix to the sample vector to perform a second rotation of the x, y, and z axes in elevation, to produce axes-translated complex signals 110*x*', 110*y*', and 110*z*'. Any known or hereafter developed matrix-based 3D axes translation may be used to rotate the x, y, and z axes, as would be appreciated by one of ordinary skill in the relevant arts.

With reference to FIG. 1C, there is an illustration of a plane of elliptical polarization EP that has been rotated in azimuth and elevation from an initial plane of polarization aligned with an x-y plane to a rotated x'-y' plane, using the rotation matrixes of FIG. 1B. The table below gives examples of complex weights that may be used to produce various polarizations.

| Polarization | Weight W_x | Weight W_y |
|---|---|---|
| LP (φ is angle from x axis in x-y plane) | cos φ | sin φ |
| RHCP lying in x-y plane: | 1 | +j |
| LHCP lying in x-y plane: | 1 | −j |
| RH elliptical polarization lying in x-y plane | a | +bj |
| LH elliptical polarization lying in x-y plane | a | −bj |

The above techniques for producing a particular polarization and steering a direction of the polarization (i.e., a plane in which the polarization lies) in 3D space are referred to as techniques for "directional polarization." To achieve directional polarization, receive system 100 controls the amplitude and phase of complex signals 110*x*, 110*y*, and 110*z* relative to each other based on the complex weights to apply a desired polarization and rotates a plane of the polarization in different directions based on the angle signals. To do this, receive system 100 applies complex weights W_xi, W_yi, and W_zi to complex signals 110*x*, 110*y*, and 110*z* (e.g., applies the complex weights to digitized baseband complex samples of the complex signals) and translates 3D axes associated with the complex samples according to angle signals to align the polarization plane of the polarization produced responsive to the complex weights with a desired spatial direction. In the example of FIG. 1A, controller 107 adjusts the complex weights and the angle signals for/corresponding to each receive processor 106(*i*) to point the polarization at a particular satellite, e.g., to generate RHCP and point the normal of the polarization plane for the RHCP at the particular satellite. The same complex signals 110*x*, 110*y*, and 110*z* (e.g., the same digitized baseband samples of the complex signals) may be used to point to N distinct satellites by using N distinct sets of complex weights and angle signals, one distinct set per receive processor.

Figure 1D:
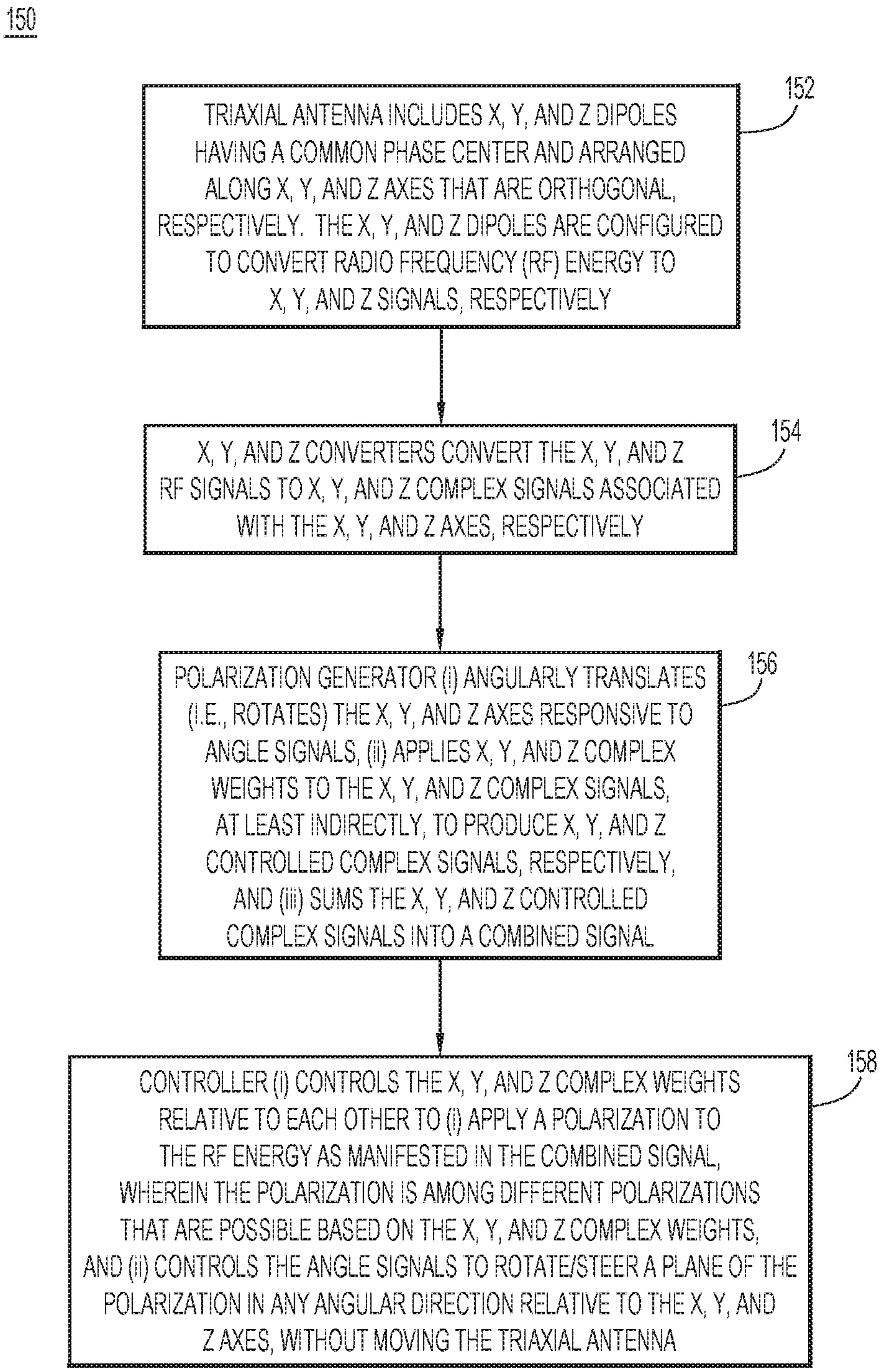
FIG. 1D is a flowchart of an example method of applying polarization and rotating a plane of the polarization based on complex weights and angle signals, performed by the receive system.

With reference to FIG. 1D, there is a flowchart of an example method 150 performed by receive system 100.

At 152, triaxial antenna 102, including (3D) x, y, and z dipoles (e.g., dipoles 102*x*, 102*y*, and 102*z*) having a common phase center and arranged along x, y, and z (orthogonal) axes that are orthogonal, respectively, receives radiant RF energy. The x, y, and z dipoles convert the RF energy to (3D) x, y, and z RF signals (e.g., RF signals 108*x*, 108*y*, and 108*z*), respectively. More generally, the triaxial antenna includes x, y, and z linearly polarized elements to convert the RF energy to the x, y, and z RF signals, respectively.

At 154, x, y, and z RF downconverters (e.g., RF downconverters 104*x*, 104, *y*, and 104*z*) convert the x, y, and z RF signals to (3D) x, y, and z complex signals (e.g., complex signals 110*x*, 110*y*, and 110*z*) referenced to (e.g., associated with/aligned to) the x, y, and z axes. In an example, the RF downconverters convert the x, y, and z RF signals to x, y, and z complex baseband signals.

At 156, polarization generator 112 (*i*) angularly rotates the x, y, and z axes responsive to angle signals AZ and EL, (ii) applies (indirectly) (3D) x, y, and z complex weights (e.g., complex weights W_xi, W_yi, and W_zi) to the x, y, and z complex signals to produce (3D) x, y, and z controlled complex signals (e.g., controlled complex signals 120*x*, 120*y*, and 120*z*), respectively, and (iii) sums the x, y, and z controlled complex signals into combined signal 122.

At 158, controller 107 (*i*) controls the x, y, and z complex weights to apply a polarization to the RF energy as manifested in the combined signal, wherein the polarization is among different polarizations that are possible based on the x, y, and z complex weights, and (ii) controls the angle signals to rotate/steer a plane of the polarization in any direction relative to the x, y, and z axes (i.e., in 3D) in the receive processor, without moving the triaxial antenna. An advantage of this approach is that it is performed electronically, in the digital domain.

Removal of Noise

Figure 1E:
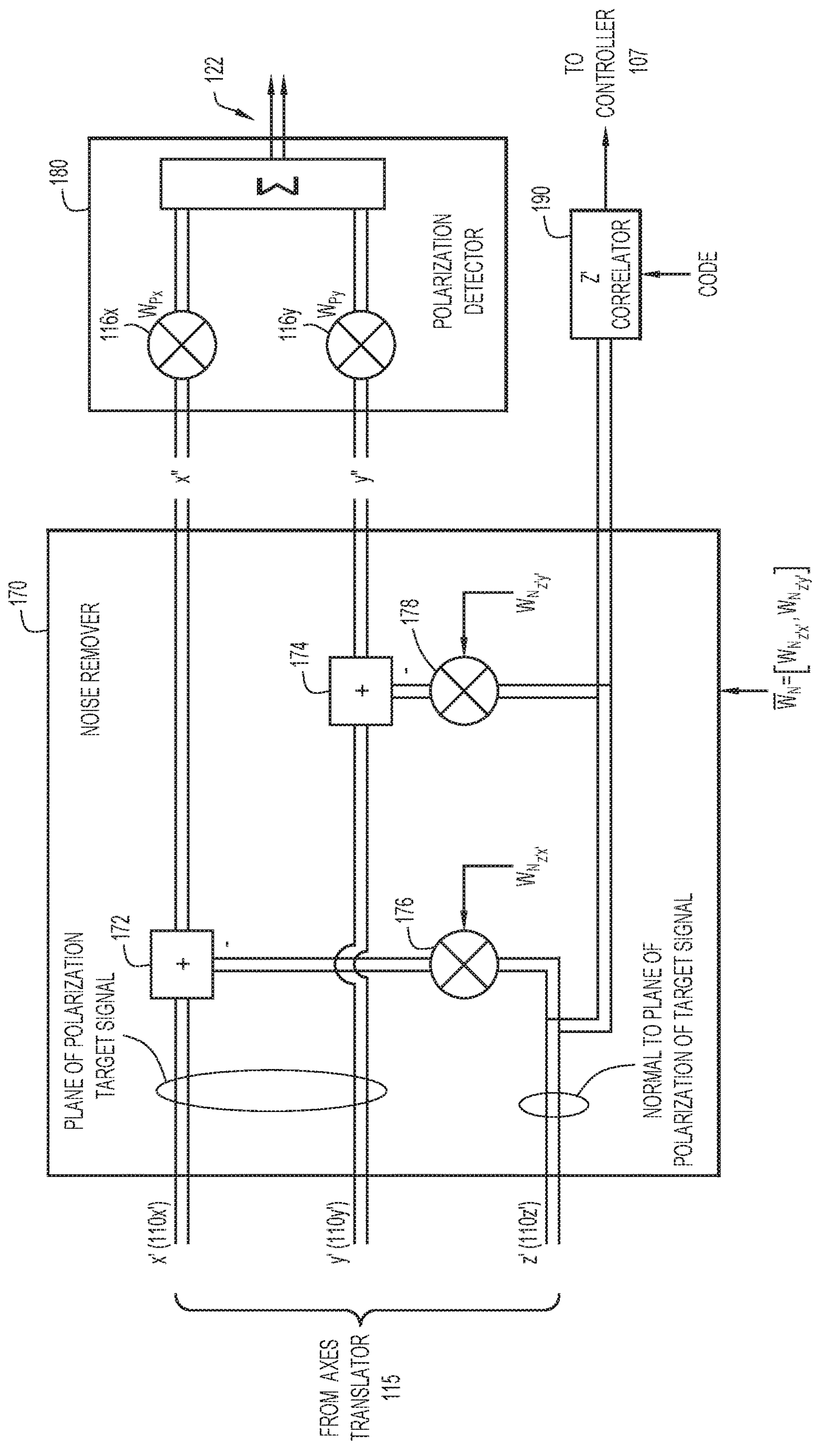
FIG. 1E is a block diagram of an example noise remover/canceler used in the receiver system to remove noise from a received signal.

With reference to FIG. 1E, there is a block diagram of an example noise remover/canceler 170 that may be used in receive system 100 to remove noise arriving from/associated with a z' direction from a received signal having a polarization lying in an x'-y' plane. Noise remover 170 may be inserted between axes translator 115 and at least two of multipliers 116*x*, 116*y*, and 116*z* (e.g., multipliers 116*x* and 116*y*). Noise remover 170 includes subtractors 172, 174 and multipliers 176, 178. Multipliers 176, 178 apply respective weights $W_{Nz'x'}$, $W_{Nz'y'}$ from controller 107 to complex signal 110*z*' representing the noise, to produce respective weighted versions of complex signal 110*z*'. Subtractors 172, 174 subtract the respective weighted versions of complex signal 110*z*' representing the noise from respective complex signal 110*x*' and 110*y*', which represent a target signal of interest, to produce respective ones of complex signals x", y", which represent the target signal with reduced noise. In other words, assuming the polarization plane of the target signal is aligned with the x'-y' plane, and assuming noise energy arriving from other directions and thus having noise components present in the z' direction, the weighting and subtraction operations of noise canceler 170 subtract/remove the z' noise components from the x'-y' target signal, to produce relatively noise free complex signals x", y".

Following noise remover 170 in FIG. 1E, multipliers 116*x*, 116*y* apply complex weights $W_{Px}$, $W_{Py}$ to complex signals x", y", respectively, and summer 118 sums the resulting weighted complex signals into complex combined signal 122, which feeds correlator 114. A maximum signal-to-noise ratio (SNR) for the output of correlator 114 may be found by dithering complex weights $W_{Px}$, $W_{Py}$, and $W_{Nz'x'}$, $W_{Nz'y'}$.

A further extension of the embodiment of FIG. 1E includes an additional correlator 190 to receive complex signal 110*z*', correlate the complex signal 110*z*' against a respective code to produce an energy measurement of the complex signal, and provide the energy measurement to controller 107. An example use of the additional energy measurement for complex signal 110*z*' is described below in connection with FIG. 3.

Detect Polarization

Figure 2:
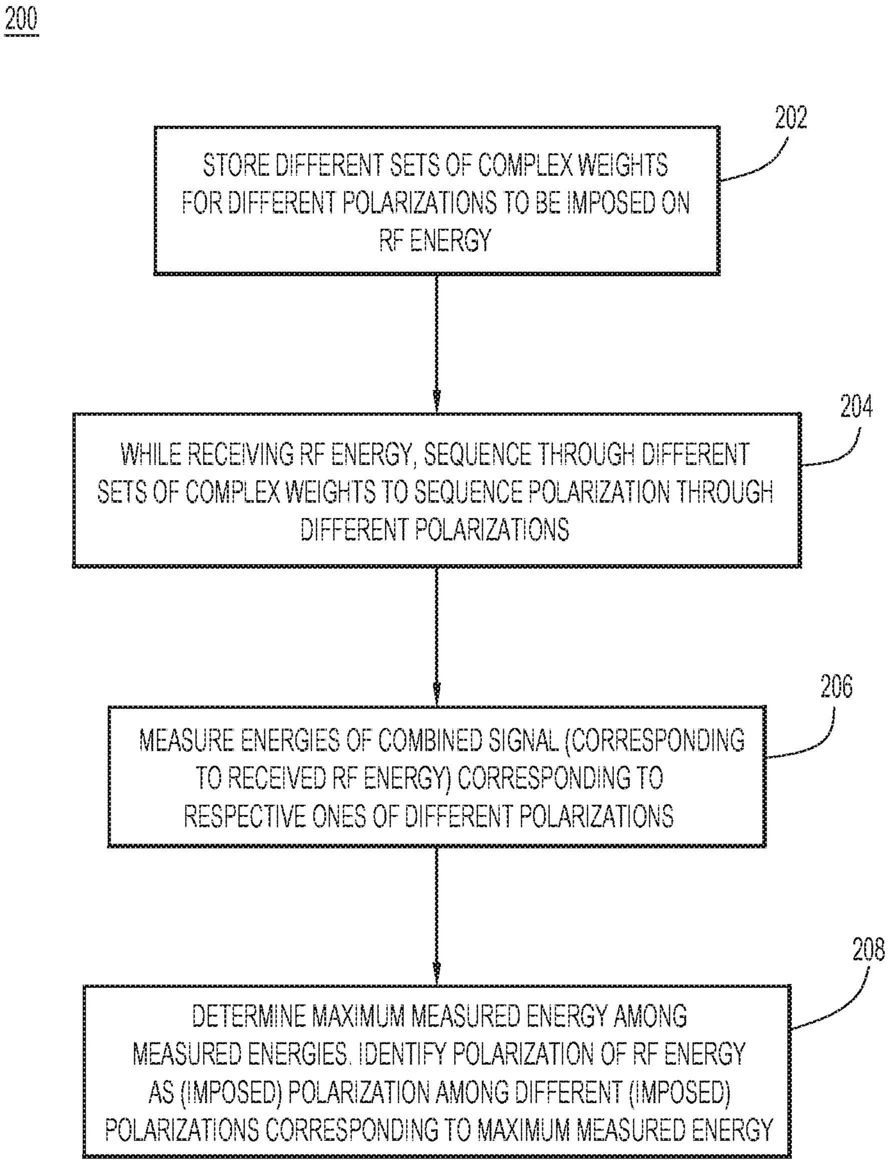
FIG. 2 is a flowchart of an example method of determining a polarization of RF energy received at the triaxial antenna primarily using the complex weights.

With reference to FIG. 2, there is a flowchart of an example method 200 of determining/detecting a polarization of the RF energy received at triaxial antenna 102 using the complex weights.

At 202, controller 107 stores complex weight vectors (Ws) (i.e., sets of complex weights W_xi, W_yi, and W_zi) for different polarizations. For example, controller 107 stores complex weight vector 1 (W_xi(1), W_yi(1), W_zi (1)) for LP, complex weight vector 2 (W_xi(2), W_yi(2), W_zi(2)) for RHCP, and complex weight vector 3 (W_xi(3), W_yi(3), W_zi(3)) for LHCP.

At 204, controller 107 sequentially applies the complex weight vectors to complex signals 110*x*, 110*y*, and 110*z* indirectly (via axes-translated complex signals 110*x*', 110*y*', and 110*z*' and complex multipliers 116*x*, 116*y*, and 116*z*), which sequentially imposes corresponding different polarizations on the RF energy. For example, controller 107 sequentially applies complex weight vectors 1, 2, and 3, which sequentially produces/imposes LP, RHCP, and LHCP. At each sequence step, controller 107 dwells for a predetermined dwell period to allow receive processor 102(*i*) to process weighted complex signals 110*x*, 110*y*, and 110*z* for the polarization corresponding to the dwell period.

At 206, controller 107 sequentially measures energies of combined signal 122 during the dwell periods corresponding to/associated with the different polarizations, e.g., during each dwell period, the controller receives an energy indication/measurement from correlator bank 114, or computes energy from the combined signal directly. For example: during a first dwell period, controller 107 measures a first energy for the LP; during a second dwell period, controller 107 measures a second energy for the RHCP; and during a third dwell period, controller 107 measures a third energy for the LHCP.

At 208, controller 107 determines a maximum measured energy among the measured energies. Controller 107 identifies the polarization of the RF energy as the polarization among the different polarizations corresponding to the maximum measured energy. For example, if the measured energy for the RHCP is the maximum measured energy, controller 107 labels the RF energy as having RHCP.

Once controller 107 determines/identifies the polarization of the RF energy, the controller may set the complex weight vector to create/impose the identified polarization on the RF energy. Alternatively, controller 107 may select a polarization that is different from the identified polarization, and set the complex weight vector to impose that different polarization.

Detect Direction of Arrival

Figure 3:
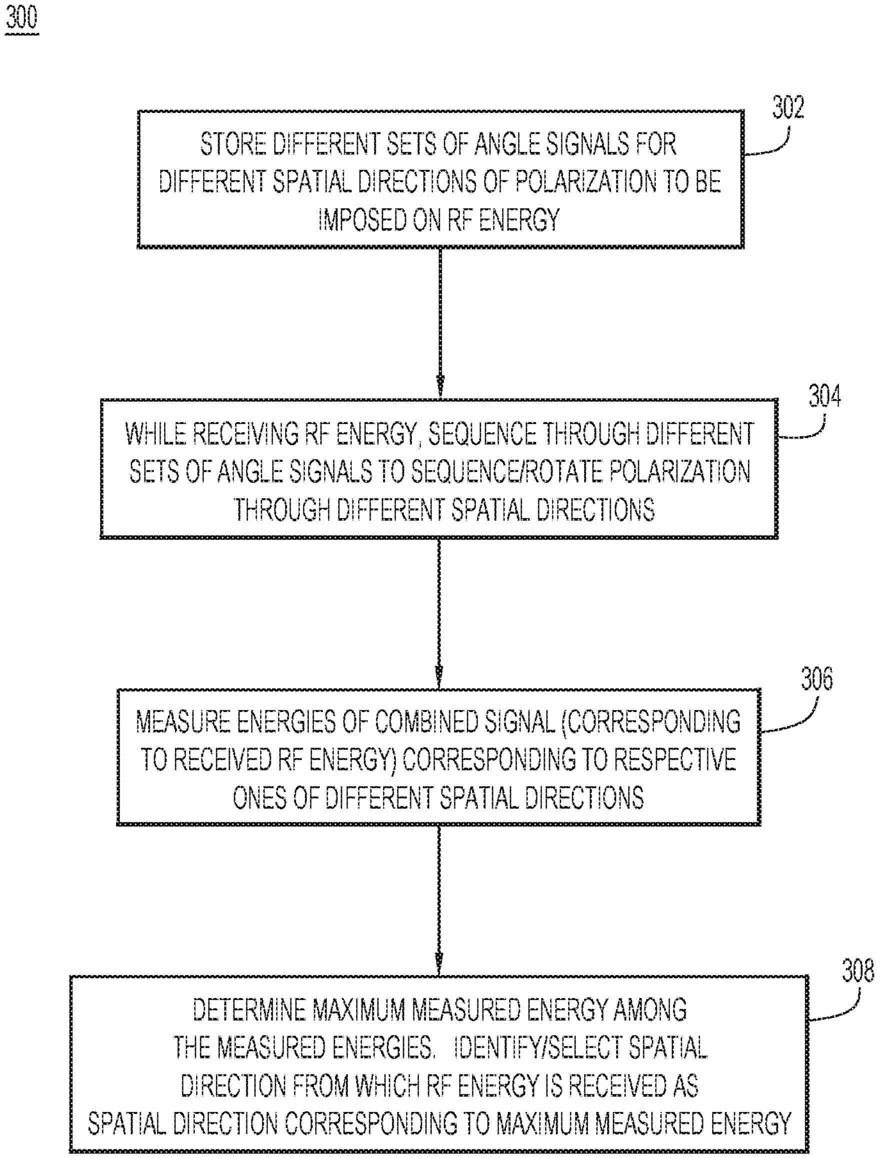
FIG. 3 is a flowchart of an example method of determining a direction from which the RF energy is received at the triaxial antenna using the complex weights and the angle signals.

With reference to FIG. 3, there is an example method 300 of determining a direction in 3D space (i.e., a spatial direction) from which the RF energy is received at triaxial antenna 102 using the angle signals. The RF energy may have an LP or a CP.

At 302, for a given polarization, controller 107 stores different sets of angle signals AZ and EL for different orientations or spatial directions of the polarization plane for the given polarization. In an example, the given polarization may hop between RHCP and LHCP, in which case controller 107 stores different sets of angle signals for each state.

At 304, controller 107 sequentially applies the different sets of angle signals AZ and EL to axes translator 115, which sequentially steers/rotates the polarization plane in corresponding directions, i.e., points the polarization plane in the corresponding directions.

At 306, controller 107 sequentially measures energies of combined signal 122 during the dwell periods corresponding to/associated with the different directions, e.g., controller 107 receives energy indications/measurements from correlator bank 114 during the dwell periods, or measures the energies directly from the combined signal during the dwell periods.

At 308, controller 107 determines a maximum measured energy among the measured energies. Controller 107 identifies/selects the direction (i.e., rotation angles) among the different directions corresponding to the maximum measured energy as the direction from which the RF energy is received. Following operation 308, controller 107 may fine tune the search for the direction. To do this, controller 107 may dither angle signals AZ, EL around their values identified at operation 308, while monitoring off-boresight signal power aligned with the z' axis as described above in connection with FIG. 1E. The dithered angle signals that result in a minimum z' signal power (or, alternatively, a minimum z' noise power when a high-power jammer signal is present) represent the fine-tuned direction.

Once controller 107 determines the direction of the RF energy, the controller may set the angle signals to point the polarization to be imposed on the RF energy to that direction. Alternatively, controller 107 may set the angle signals to point the polarization away from the direction of the RF energy.

Methods 200 and 300 may be used together in various ways to determine polarization and direction of arrival as described below in connection with FIG. 5, for example.

Figure 4:
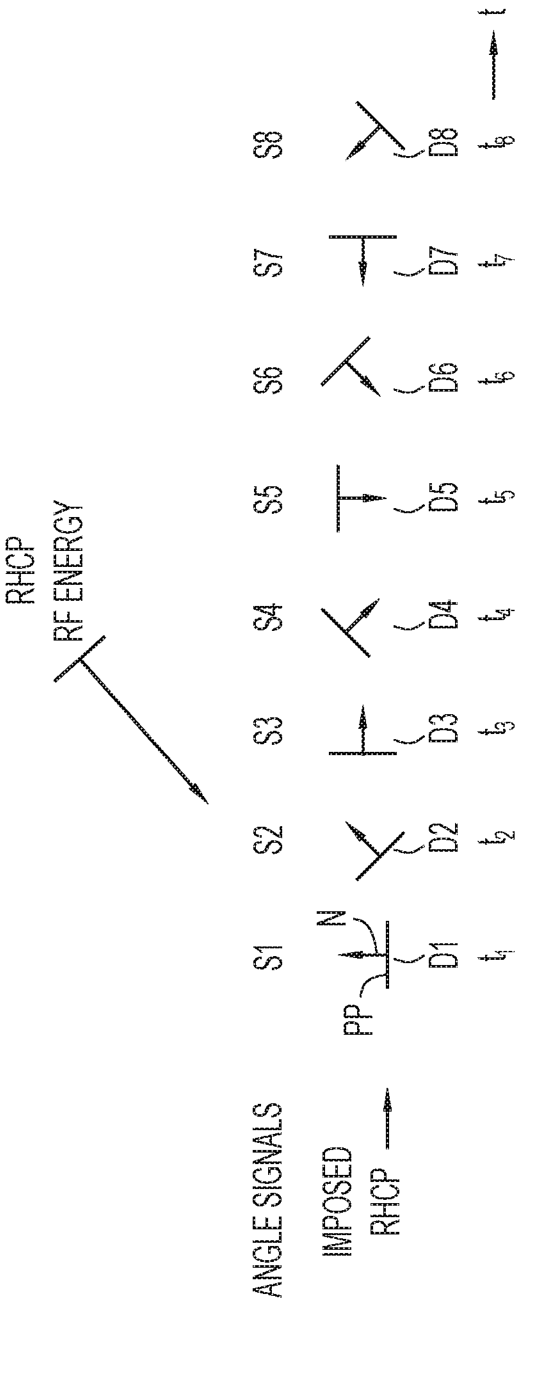
FIG. 4 is an illustration of an example of the method of FIG. 3 in which RHCP is produced/imposed on the RF energy based on the complex weights and the angle signals.

With reference to FIG. 4, there is an illustration of an example of method 300 using RHCP as the polarization to be produced/applied to the RF energy based on the complex weights. In the example of FIG. 4, the RF energy is also RH circularly polarized. As depicted in FIG. 4, the imposed RHCP has a polarization plane PP (shown in top-down view of FIG. 4) with a normal axis N. In polarization plane PP, the RHCP may be thought of as a disc, shown in the top-view of FIG. 4. In the example of FIG. 4, controller 102 stores 8 sets of angle signals S1-S8 configured to rotate polarization plane PP of the imposed RHCP (e.g., rotate the disc of the RHCP) through 8 azimuthal positions D1-D8 covering 360° about the common phase center of triaxial antenna 102, respectively. Azimuthal positions D1-D8 rotate about the z axis. Controller 107 sequences through angle signals S1-S8 to sequence/rotate polarization plane PP through positions D1-D8 at times t1-t8, respectively, and measures energies at the positions. In one example, controller 107 identifies a maximum energy corresponding to direction D2, which most closely aligns with the direction from which the RF energy is arriving at triaxial antenna 102. Controller 107 identifies direction D2 as the direction from which the RF energy is arriving. In another example, controller 107 points an edge of the plane of polarization toward the incoming energy, as shown at D4 and D8, in which case the RHCP energy is equal to the LHCP energy, such that RHCP-LHCP energy=0. Controller 107 searches for the angle at which the RHCP-LHCP energy is a minimum.

Reject Directional Interferer (Jammer)

Figure 5:
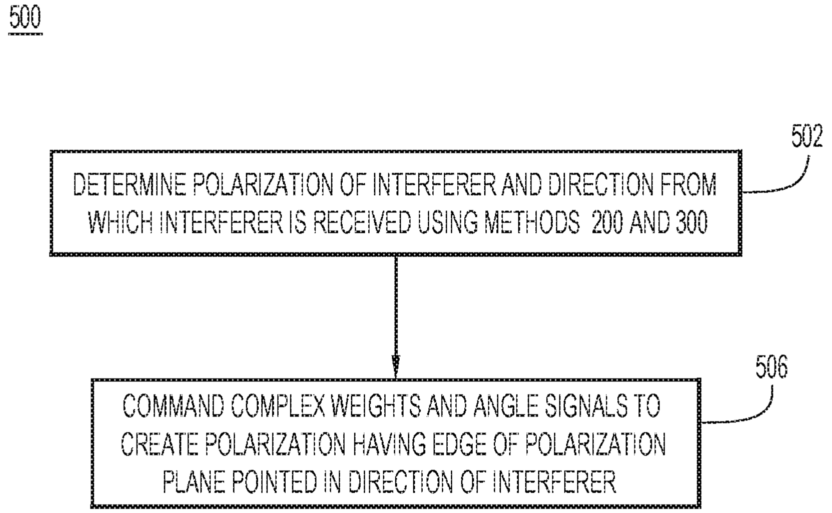
FIG. 5 is an illustration of an example method of suppressing an interferer or jammer energy received at the triaxial antenna using the complex weights and the angle signals.

With reference to FIG. 5, there is an illustration of an example method 500 of suppressing an interferer or jammer energy received at triaxial antenna 102 using the complex weights and angle signals.

At 502, controller 107 determines a polarization of the interferer and a direction from which the interferer is received using methods 200 and 300, together. For example, controller 107 controls the complex weights to determine the polarization of the interferer. Controller 107 may determine that the interferer includes linearly polarized energy or elliptically polarized energy (e.g., energy with RHCP or LHCP). Also, controller 107 controls the angle signals to determine the interferer direction.

At 506, controller 107 commands the complex weights and the angle signals to create/impose on the interferer a polarization having a polarization plane oriented to such that the edge of the plain is pointed toward the interferer.

The above methods may be combined to implement triaxial anti jam processing to handle different jamming scenarios, described below.

In a first case, triaxial antenna 102 receives (i) a RH circularly polarized interferer (i.e., a RHCP interferer) from a jammer, and (ii) desired RHCP energy. First, controller 107 determines a direction from which the RHCP interferer is arriving using method 300. Once controller 107 determines the direction of the RHCP interferer, controller 107 controls/commands the complex weights to (i) create/impose RHCP polarization, and (ii) controls/commands the angles signals to steer/point the normal axis of the polarization plane of the (imposed) RHCP in a direction that is orthogonal to the direction of the RHCP interferer, such that an edge of the (imposed) polarization plane is aligned with the direction of the RHCP. As a result, the RHCP interferer appears as linearly polarized energy in combined signal 122. Controller 107 then subtracts the “linear” interferer energy from combined signal 122 to recover the desired RHCP energy from the combined signal. Any known or hereafter developed jammer excision algorithm may be used to subtract the linear interferer from the combined signal. Jammer excision may result in up to 20 dB of rejection of the RHCP interferer (i.e., of jammer energy). At the same time, steering the polarization plane to reject the RHCP interferer may also cause some degradation to the desired RHCP energy because the steering may push the polarization plane off-boresight with respect to a direction from which the desired RHCP energy is received. Such degradation of the desired RHCP energy caused by the off-boresight steering is typically less than 3 dB. As a result, the net increase in signal-to-jammer energy is 20 dB−3 dB=17 dB.

In a second case, triaxial antenna 102 receives a first interferer that is linearly polarized and a second interferer that is either linearly polarized or circularly polarized. System 100 suppresses the first interferer using jammer excision as in the first case described above. With respect to the second interferer, system 100 controls the angle signals to create a polarization plane that points in a direction that is orthogonal to a direction from which the second interferer is received, such that the second interferer appears as linearly polarized energy, which is then excised along with the first interferer.

In a third case, triaxial antenna 102 receives an interferer that is linearly polarized, i.e., produced by a linearly polarized jammer dipole. In this case, system 100 controls the complex weights in combination with the angle signals to create a virtual linearly polarized (antenna) element that can be rotated in 3D space based on the complex weights. That is, controller 107 controls the complex weights to create a virtual linearly polarized element, e.g., a dipole element, and controls the angles signals so that the virtual dipole element lies in a polarization plane that is orthogonal to the LP of the interferer. Controller 107 may use different approaches to determine the set of complex weights and angle signals that establish the orthogonality. In one approach, controller 107 may adjust the angle signals to adaptively rotate the polarization plane until energy associated with the interferer (as manifested in combined signal 122) is minimized. In another approach, controller 107 uses the complex weights and the angle signals to determine an orientation of the LP of the interferer, and then uses the complex weights and the angle signals to create a virtual dipole that lies in a plane orthogonal to the determined orientation. In yet another approach, controller 107 uses the complex weights and the angle signals to create a virtual dipole whose end is pointing toward the interferer.

In another variation of the third case, controller 107 may control the complex weights and the angle signals to rotate the virtual dipole within the orthogonal plane to maximize energy of desired RHCP energy in combined signal 122. In this variation, the desired RHCP energy is received with the virtual linearly polarized element, with approximately 3 dB of degradation, but interferer energy is suppressed by a greater amount due to orthogonality of the virtual dipole to the interferer energy.

Triaxial processing may be used to enable receive system 100 to distinguish between desired signals and a "spoofer" that transmits one or more spoofer signals from a single spoofer location. A true GPS signal has a different optimal weight vector W_i (or different unweighted correlation values in x, y, and z directions) and angle signals for each SV because each SV signal originates from a different part of the sky. A spoofing signal has an optimal weight vector $W\_i_{spoofer}$ and angle signals for multiple SVs because the spoofer transmits all spoofer signals from one location. Additionally, the spoofing signals usually originate from terrestrial sources, which will have different optimal weights W_i and angle signals than SVs moving across the sky. Triaxial receive processing can use this information to: ignore a spoofing signal; report a spoofing attack; form a null directed to a spoofer (for the triaxial phased array antenna described below in connection with FIGS. 6A and 6B); and determine and report a direction of the spoofer.

Array Receive Processing—Polarization with Antenna Nulling

Figure 6A:
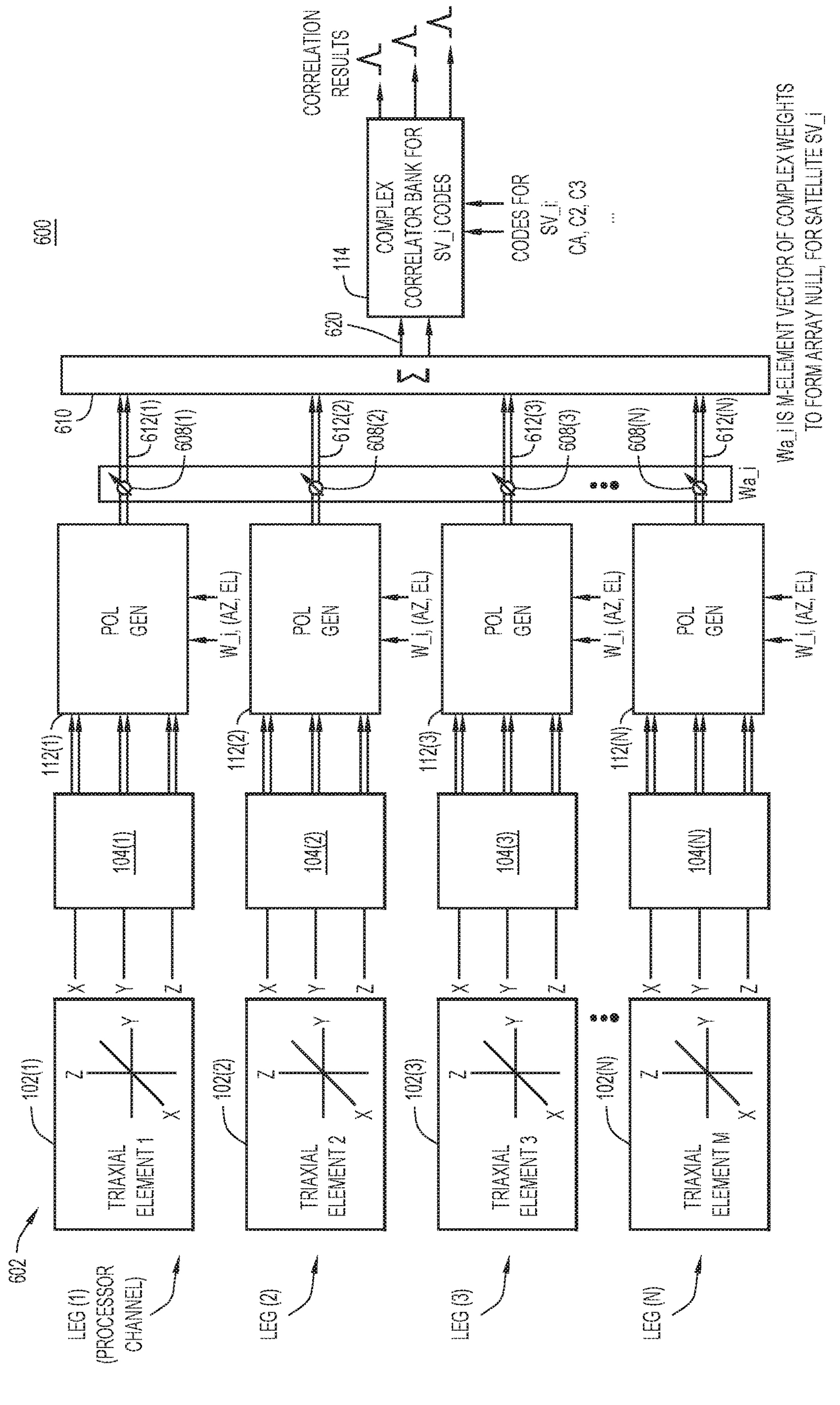
FIG. 6A is a block diagram of an example receive system that applies polarization complex weights, angle signals, and nulling complex weights to triaxial signals from an N-element array of triaxial antennas to control antenna polarization and antenna nulling.

With reference to FIG. 6A, there is a block diagram of a receive system 600 that applies first and second layers of complex weights to triaxial signals from an N-element array of triaxial antennas (also referred to as "antenna elements") to apply polarization, rotation of polarization, and antenna nulling. Receive system 600 includes an array 602 of triaxial antennas 102(1)-102(N) (forming a phased array antenna), RF downconverter/digitizer assemblies 104(1)-104(N) fed by respective ones of the triaxial antennas, polarization generators 112(1)-112(N) fed by respective ones of the RF downconverter/digitizer assemblies, complex multipliers 608(1)-608(M) fed by respective ones of the polarization generators, a summer 610 fed by the multipliers, and correlator bank 114 fed by the summer. Triaxial antenna 102(*i*), RF downconverter/digitizer 104(*i*), and polarization generator 112(*i*) of each leg(i)/processing channels(i) of receive system 600 operate substantially the same as triaxial antenna 102, RF downconverter/digitizer 104, and polarization generator 112, respectively, described above in connection with FIG. 1A.

For each triaxial antenna 102(*i*), corresponding polarization generator 112(*i*) receives a respective 3D first/polarization complex weight vector W_i and respective angle signals AZ, EL (from controller 107, not shown in FIG. 6A) to apply a respective polarization and rotate a plane of the polarization in one or more respective angular directions, as described above in connection with FIGS. 1A-5 for the single triaxial antenna. For example, each first complex weight vector W_i and the angle signals AZ, EL may be used to control the polarization and the direction of the polarization with respect to triaxial antenna 102(*i*) for jammer rejection.

As shown in FIG. 6A, each polarization generator 112(*i*) produces a respective combined complex signal in which the respective polarization and plane of polarization as rotated is represented/manifested, and provides the combined complex signal to a corresponding one of complex multipliers 608(*i*). Each complex multiplier 608(*i*) also receives a respective second complex weight Wa_i(i) (also referred as a nulling complex weight Wa_i(i)) of a vector Wa_i of N second complex weights provide by controller 107. Each complex multiplier 608(*i*) applies second complex weight Wa_i(i) (including amplitude and phase weights) to the corresponding combined complex signal from corresponding polarization generator 112(*i*), to produce a corresponding weighted combined complex signal 612(*i*), and provides the weighted combined complex signal to summer 610. Summer 610 sums the weighed combined complex signals 612(1)-612(N) into a combined complex signal 620, and provides the combined complex signal to correlator bank 114. The N second/nulling complex weights Wa_i(1)-Wa_i(N) of complex weight vector Wa_i weight the signals from triaxial antennas 102(1)-102(N), respectively, to form and direct receive antenna pattern nulls. For example, complex weight vector Wa_i may be used to form a null in a direction of an interferer.

Accordingly, first complex weights W_i and angle signals AZ, EL apply and steer polarization as described above, and second complex weights Wa_i create and direct antenna nulls. First and second complex weights W_i and Wa_i and angle signals AZ, EL may be applied concurrently to apply and steer polarization, and create and direct antenna nulls, concurrently. Receive system 600 uses first complex weights W_i and angle signals AZ, EL to implement one of the above anti jam techniques (jammer excision, or virtual rotation of CP plane) at each triaxial antenna 102(*i*) antenna array 602, then superimposes second complex (nulling) weights Wa_i on each triaxial antenna to create a null in a direction of a jammer to further minimize received jammer energy. Moreover, first complex weights W_i and angle signals AZ, EL can be used to determine an incoming direction of jammer energy to aid in an antenna nulling algorithm. Also, first complex weights W_i and angle signals AZ, EL can be used to identify a spoofer, so that second complex weights Wa_i can be used to form a null in a direction of the spoofer. Thus, techniques that combine the use of first and second complex weights W_i and Wa_i provide greater jammer rejection, additional antenna pattern nulls, distinguish between signal and jammer energy so that adaptive nulling algorithms can form antenna nulls on jammer energy only, not signal energy.

Receive system 600 also provides improvements in an axial ratio for CP for the following reasons. Receive system 600 implements directional CP by controlling the relative phases of the x, y, and z dipoles of each triaxial antenna 102(*i*). The ability of each triaxial antenna 102(*i*) to transmit CP in any direction reduces degradation of AR with increasing scan angle, both for antenna array 602 and for a single triaxial antenna. Triaxial antennas 102(1)-102(N) (i.e., antenna array elements) of antenna array 602 can be divided into groups so that one group of triaxial antennas is pointing CP in one direction while another group is pointing CP in another direction, with the same or opposite sense (e.g., RHCP or LHCP) for each CP. The aspect ratio can be adjusted by first complex weights W_i weights to compensate for implementation, design constraints, and so on.

Figure 6B:
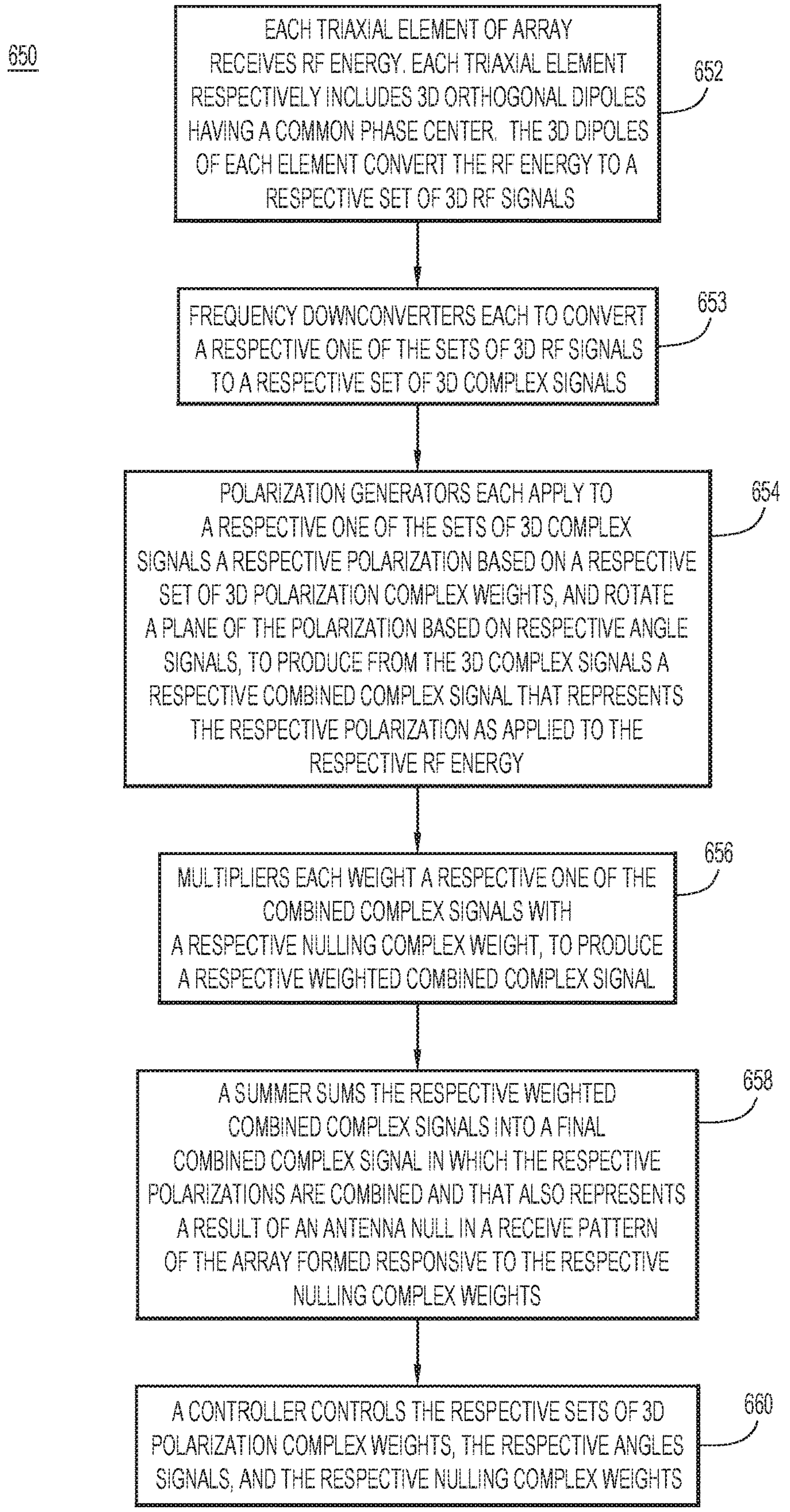
FIG. 6B is a flowchart of an example method of controlling polarization and antenna nulling performed by the receive system of FIG. 6A.

With reference to FIG. 6B, there is a flowchart of an example method 650 performed by receive system 600.

At 652, each triaxial element 102(*i*) converts RF energy to a respective set of 3D RF signals (e.g., x, y, and z RF signals).

At 653, each RF downconverter/digitizer assembly 104(*i*) converts a respective one of the 3D RF signals to a respective set of 3D x, y, and z complex signals (e.g., x, y, and z complex signals).

At 654, each polarization generator 112(*i*) applies to a respective one of the sets of 3D complex signals a respective polarization based on a respective set of 3D polarization complex weights (e.g., x, y, and z complex weights), and rotates a plane of the polarization based on respective angle signals (e.g., AZ and EL angle signals), to produce from the 3D complex signals a respective combined complex signal that represents the respective polarization as applied to the respective RF energy from respective triaxial antenna element 102(*i*).

At 656, multiplier 608(*i*) applies to a respective on of the combined complex signals a respective nulling complex weight from a set of nulling complex weights Wa_i, to produce a respective weighted combined complex signal 612(*i*).

At 658, summer 610 sums the respective weighted combined complex signals 612(1)-612(N) from complex multipliers 608(1)-608(N) into final combined complex signal 620 in which the respective polarizations are combined and that also represents a result of an antenna null in a receive pattern of the array formed responsive to the respective nulling complex weights.

At 660, controller 107 controls the respective sets of 3D polarization complex weights, the respective angle signals AZ, EL, and the respective nulling complex weights to apply a receive polarization to the received RF energy as manifested in combined complex signal 620, steer a plane of the polarization in any direction in 3D space, and create an antenna null in a receive pattern of antenna array 602 and steer the antenna null in any direction in 3D space, all without moving the array.

Triaxial Transmit Processing

A transmit embodiment is now described in connection with FIGS. 7A and 7B.

Figure 7A:
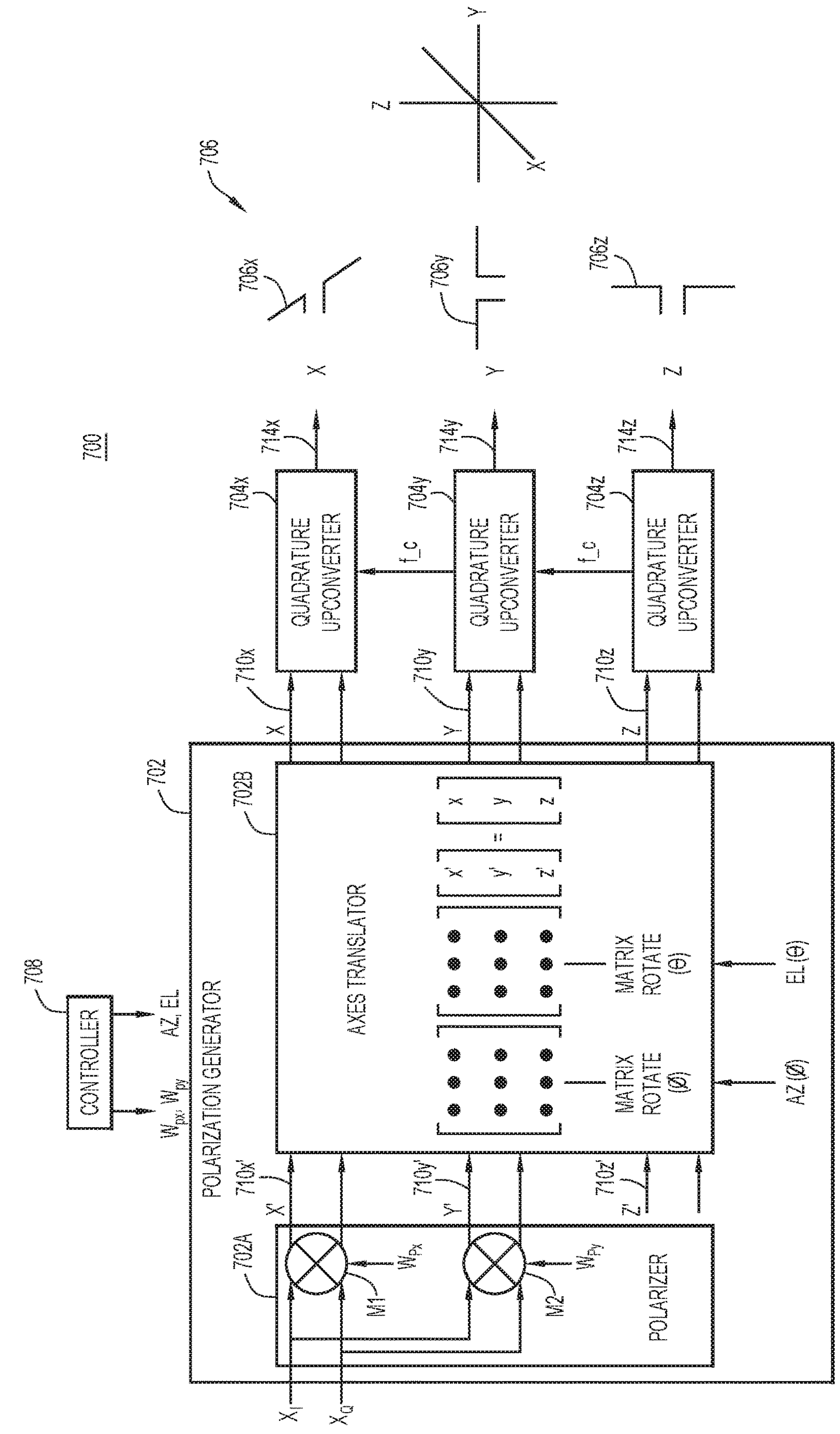
FIG. 7A is a block diagram of an example transmit system that applies complex weights and angle signals to 3D/triaxial signals to control transmit polarization.

With reference to FIG. 7A, there is a block diagram of an example transmit system 700 that uses complex weights and angle signals to implement steerable, polarized spatial modulation. Transmit system 700 includes a polarization generator 702, quadrature (frequency) upconverter-modulators 704*x*, 704*y*, and 704*z* (also referred to as x, y, and z quadrature upconverter-modulators) coupled to the polarization generator, a triaxial antenna 706 coupled to the quadrature upconverter-modulators, and a controller 708 coupled to the polarization generator and the quadrature upconverter-modulators. Polarization generator 702 includes a polarizer 702A followed by an axes translator 702B. Polarization generator 702 may be part of a baseband processor, not shown in FIG. 7A.

Polarizer 702A of polarization generator 702 receives baseband complex signals $X_I$, $X_Q$ in parallel. Complex signals $X_I$, $X_Q$ each includes a respective stream of digital information, such as general data, navigation codes, e.g., pseudo-noise (PN) codes, and the like. The digital information may include a stream of digital bits each having a bit value of, e.g., 1 or 0, or +1 or −1. Polarizer 702A includes complex multipliers/mixers M1, M2 that each receives signals $X_I$, $X_Q$. Complex multipliers M1, M2 also receive complex polarization weights $W_{Px}$, $W_{Py}$, respectively (also referred to more simply as "complex weights"). Complex multiplier M1 applies complex weight $W_{Px}$ to complex signals $X_I$, $X_Q$ to produce a complex signal 710*x*', and complex multiplier M2 applies complex weight $W_{Py}$ to complex signals $X_I$, $X_Q$ to produce a complex signal 710*y*'. Together, 2D complex signals 710*x*' and 710*y*' represent/convey a polarization based on complex weights $W_{Px}$, $W_{Py}$ that lies in an x'-y' plane of a coordinate system having (3D) x', y', and z' orthogonal axes. That is, complex signals 710*x*' and 710*y*' are referenced to the x', y', and z' axes.

Axes translator 702B of polarization generator 702 receives weighted complex signals 710*x*' and 710*y*', and a weighted complex signal 710*z*' (which may be set equal to zero). Axes translator 702B angularly translates/rotates the (3D) x', y', and z' (orthogonal) axes associated/aligned with (3D) complex signals 710*x*', 710*y*', and 710*z*' in one or more of azimuth φ and elevation θ responsive to angle signals AZ and EL, respectively, to produce baseband (3D) axes-translated/rotated complex signals 710*x*, 710*y*, and 710*z* referenced to (3D) x, y, and z (orthogonal) axes (i.e., a rotated version of the x', y', and z' orthogonal axes). Axes translator 702B operates similarly to axes translator 115 described above in connection with FIGS. 1A and 1B. Thus, axes translator 702B rotates the plane of polarization represented by complex signals 710*x*' and 710*y*' responsive to angle signals AZ and EL. This may also be thought of as steering/rotating a normal to the plane of polarization (wherein the normal is represented by the z' axes) in azimuth and elevation, which correspondingly tilts the plane of polarization.

In an example, initially, polarizer 702A applies complex weights to $X_I$, $X_Q$ to form RHCP in an x-y polarization plane (pointing straight up). This results in the following values for complex signals x' (710*x*'), y' (710*y*'), and z' (710*z*'):

| Complex Signal | I | Q |
|---|---|---|
| x' (710x') | 1 | 0 |
| y' (710y') | 0 | −1 |
| z' (710z') | 0 | 0 |

Then, axes translator 702B shifts the x-y polarization plane to a desired (φ, θ) aim point, wherein φ is azimuth, and θ is elevation. To do this, first, axes translator 702B steers the x-y plane in elevation θ, to 60° off boresight by multiplying by a 3×3 rotation matrix around the y axis. Second, axes translator 702B multiplies the result by a second rotation matrix around the z axis, for an azimuth shift φ of 30°. When applying the two matrix rotations, order is important. The first rotation is for θ tilt around the y axis, and the second rotation is for φ rotation around the z axis: RHCP, steer φ=30°, θ=60°. This results in the following new values for complex signals x (710*z*), y (710*y*), and z (710*z*):

| Complex Signal | I | Q |
|---|---|---|
| x (710x) | 0.4330 | 0.5000 |
| y (710y) | 0.2500 | −0.8660 |
| z (710z) | −0.8660 | 0.0000 |

In this example, the above translations/rotations steer the RHCP x-y polarization plane in the desired direction by changing the values of the x, y, and z complex signals as applied to the inputs to the x, y, and z antenna dipoles.

In summary, polarization generator 702 receives complex signals $X_I$, $X_Q$ in parallel, and:

a. Applies to the complex signals 2D complex weights (e.g., complex weights $W_{Px}$, $W_{Py}$) to produce polarized 2D complex signals (e.g., complex signals 710*x*', 710*y*') that represent a polarization lying in a plane of polarization coinciding with the x'-y' plane referenced to 3D orthogonal axes x', y', and z'; and b. Operates on the polarized 2D complex signals to rotate the plane of polarization angularly with respect to the 3D orthogonal axes, to produce (3D) controlled/rotated complex signals 710*x*, 710*y*, and 710*z* that represent the polarization with the rotated plane of polarization.

Axes translator 702B provides baseband complex signals 710*x*, 710*y*, and 710*z* to quadrature upconverter-modulators 704*x*, 704*y*, and 704*z*, respectively. Each of quadrature upconverter-modulators 704*x*, 704*y*, and 704*z* also receives a frequency f_c from an oscillator or clock. Based on common frequency f_c, quadrature upconverter-modulators 704*x*, 704*y*, and 704*z* modulate/frequency-upconvert complex signals 710*x*, 710*y*, and 710*z*, to produce 3D RF modulated signals 714*x*, 714*y*, and 714*z*, respectively. Quadrature upconverter-modulators 704*x*, 704*y*, and 704*z* provide RF modulated signals 714*x*, 714*y*, and 714*z* to dipoles 706*x*, 706*y*, and 706*z* of triaxial antenna 706, respectively. Triaxial antenna 706 radiates RF modulated energy (i.e., an RF modulated signal) having (i) a polarization (e.g., type of polarization, such as RCHP, LHCP, LP, and so on) controlled based on complex weights $W_{Px}$, $W_{Py}$ and the values of digital information, and (ii) a direction of polarization (i.e., orientation of the plane of polarization) controlled responsive to angle signals AZ and EL. Controller 708 controls weights $W_{Px}$, $W_{Py}$ and angle signals AZ, EL to control the polarization and rotation of the plane of polarization, respectively. Controller 708 controls the complex weights $W_{Px}$, $W_{Py}$ to apply a selected polarization among different polarizations that are possible based on the complex weights.

Assuming the digital information carried in complex signals $X_I$, $X_Q$ is time-varying, applying complex weights $W_{Px}$, $W_{Py}$ to the complex signals, and rotating the orthogonal axes associated with the complex signals responsive the angle signals, results in triaxial antenna 702 transmitting an RF modulated signal as a correspondingly time-varying, polarization varying, and direction-of-polarization-varying RF signal. In one example, for a terrestrial or indoor navigational system, triaxial antenna 706 may transmit CP aimed at the horizon, hopped between RHCP and LHCP responsive to values of a PN code (e.g., where the PN code transitions between values of 1 and 0, which results in polarization transitions between RHCP and LHCP). Also, the polarization plane may be rotated in time at a fixed rate, e.g., which is slower than a bit rate of the PN code. Rotation of the polarization plane may be similar to the rotation described in connection with FIG. 4. There are many different possibilities for time-varying, polarization-varying, and direction-of-polarization-varying the transmitted signal, e.g., the polarization plane disc may be rotated in x and y, while also rotating in z, according to encoded information or at fixed or time-varying rates of rotation, and so on. Also, polarization generator may receive additional PN codes that result in further layers of time-varying polarization.

The table below gives examples of complex weights that may be used to produce various polarizations.

| Polarization | Weight $W_{Px}$ | Weight $W_{Pz}$ |
|---|---|---|
| LP (φ is angle from x axis in x-y plane) | cos φ | sin φ |
| RHCP lying in x-y plane: | 1 | −j |
| LHCP lying in x-y plane: | 1 | +j |
| RH Elliptical | a | −bj |
| LH Elliptical | a | +bj |

Figure 7B:
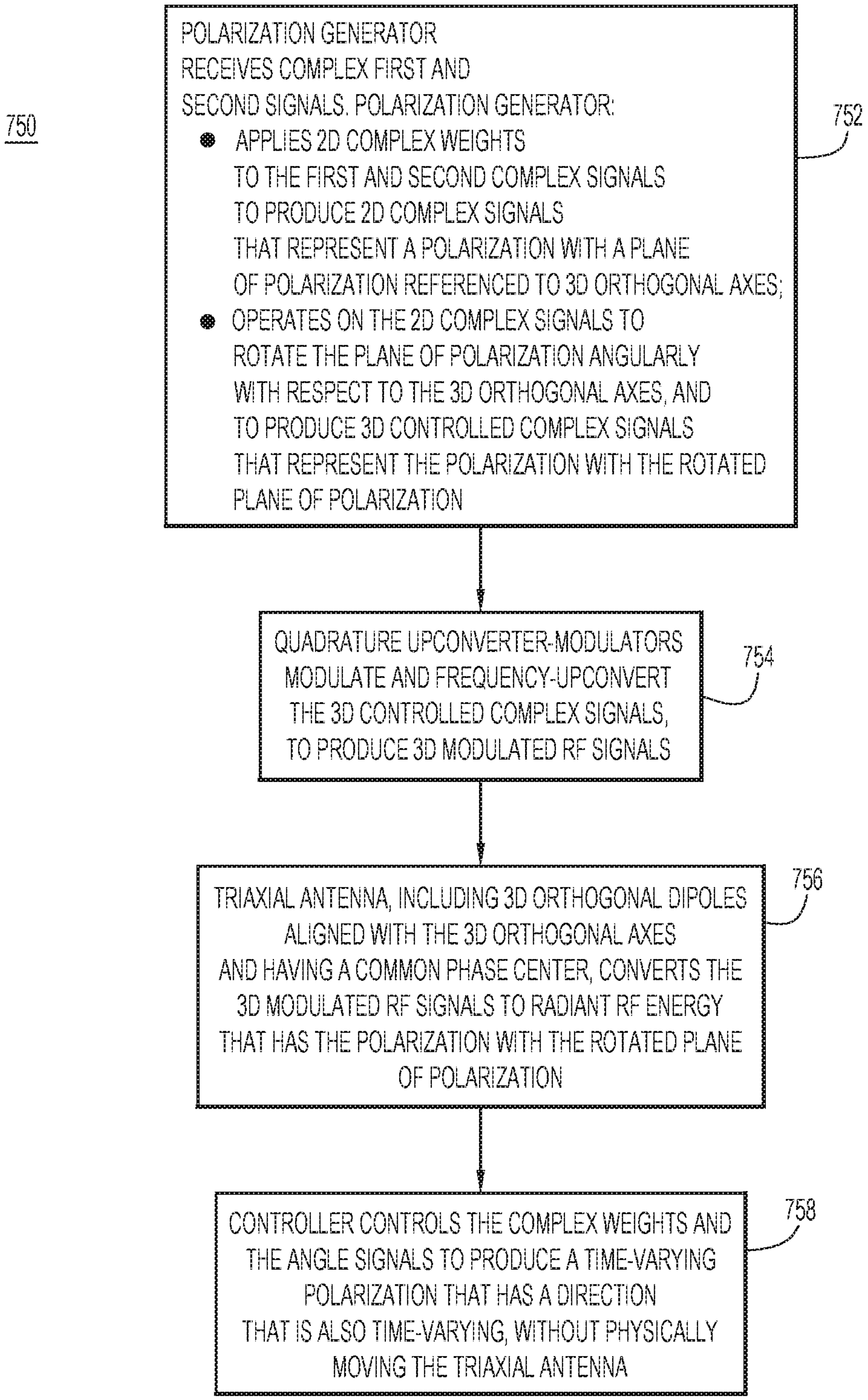
FIG. 7B is a flowchart of an example method performed by the transmit system.

With reference to FIG. 7B, there is a flowchart of an example method 750 performed by transmit system 700.

At 752, polarization generator 702 receives quadrature first and second signals (e.g., quadrature I, Q signals). Polarization generator 702:

a. Applies 2D complex weights (e.g., complex weights $W_{Px}$, $W_{Py}$) to the first and second complex signals to produce 2D complex signals (e.g., complex signals 710*x*', 710*y*') that represent a polarization with a plane of polarization referenced to 3D orthogonal axes (e.g., axes x', y', and z'); and b. Operates on the 2D complex signals to rotate the plane of polarization angularly with respect to the 3D orthogonal axes, and to produce 3D controlled complex signals (e.g., controlled complex signals 710*x*, 710*y*, and 710*z*) that represent the polarization with the rotated plane of polarization.

At 754 quadrature upconverter-modulators (e.g., quadrature upconverter-modulators 704*x*, 704*y*, and 704*z*) modulate and frequency-upconvert the 3D controlled complex signals, to produce 3D/triaxial modulated RF signals (e.g., modulated RF signals 714*x*, 714*y*, and 714*z*).

At 756, a triaxial antenna (e.g., triaxial antenna 706) including 3D orthogonal dipoles (e.g., dipoles 706*x*, 706*y*, and 706*z*) aligned with the 3D orthogonal axes (e.g., axes x, y, and z) and having a common phase center, receives at respective ones of the 3D orthogonal dipoles respective ones of the 3D modulated RF signals. The 3D orthogonal dipoles collectively convert the 3D modulated RF signals to radiant RF energy that has the polarization with the rotated plane of polarization. More generally, the triaxial antenna includes 3D linearly polarized elements to receive (and radiate) respective ones of the 3D modulated RF signals.

At 758, a controller (e.g., controller 708) controls the complex weights and the angle signals to produce a time-varying polarization that has a direction (i.e., rotation of the plane of polarization) that is also time-varying, without physically moving the triaxial antenna.

Antenna Configurations

Various receive and transmit antenna configurations are now described in connection with FIGS. 8-10.

Figure 8A:
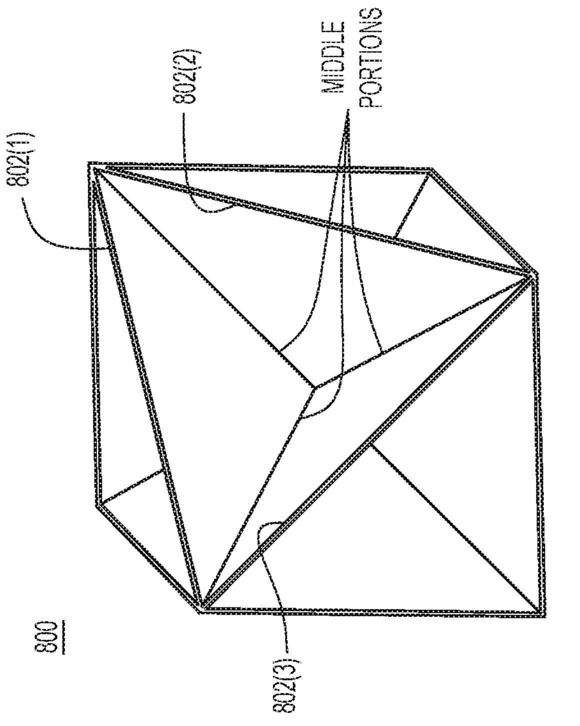
FIG. 8A is a perspective view of an example printed circuit board (PCB) triaxial antenna.

With reference to FIG. 8A there is a perspective view of triaxial antenna 800, according to an embodiment. Triaxial antenna 800 may be used in triaxial antennas 102, 102(*i*), and 706 in systems 100, 600, and 700, respectively. In the example of FIG. 8, triaxial antenna 800 is implemented as a printed circuit board (PCB) triaxial antenna. Triaxial antenna 102 includes generally flat, PCBs 802(1), 802(2), and 802(3) that lie in orthogonal, first, second, and third planes, respectively, and that carry electrically conductive linearly polarized elements (not shown in FIG. 8A), respectively. In the example of FIG. 8, PCBs 802(1)-802(3) are square and give triaxial antenna a cubic form factor; however, the PCBs may be other shapes suitable for carrying the linearly polarized elements. Orthogonal PCBs 802(1)-802(3) are arranged in a crisscross fashion to intersect each other at respective middle portions of the PCBs (as depicted in FIG. 8A), such that the linearly polarized elements carried on the PCBs have a common phase center.

Figure 8B:
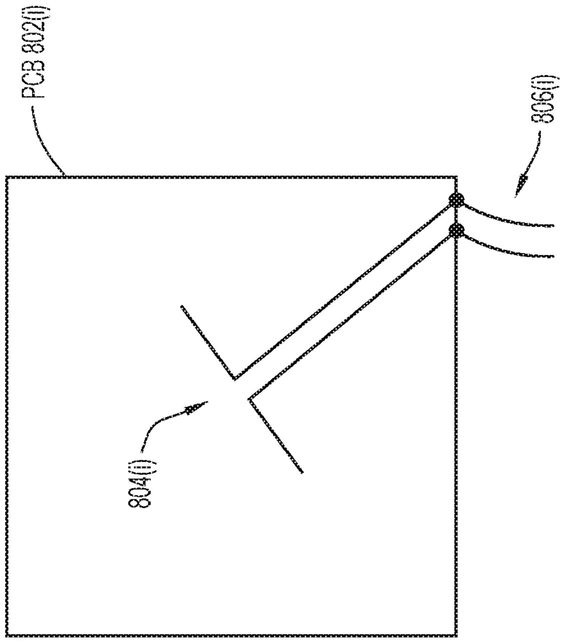
FIG. 8B is a top view of a PCB of the triaxial antenna of FIG. 8A.

With reference to FIG. 8B, there is a top view of each PCB 802(*i*). PCB 802(*i*) carries electrically conductive linearly polarized element 804(*i*), e.g., a dipole, which may be formed as copper traces on the PCB. Electrically conductive leads 806(*i*), connected to linearly polarized element 804(*i*), represent an RF feed to/from the linearly polarized element.

Figure 9:
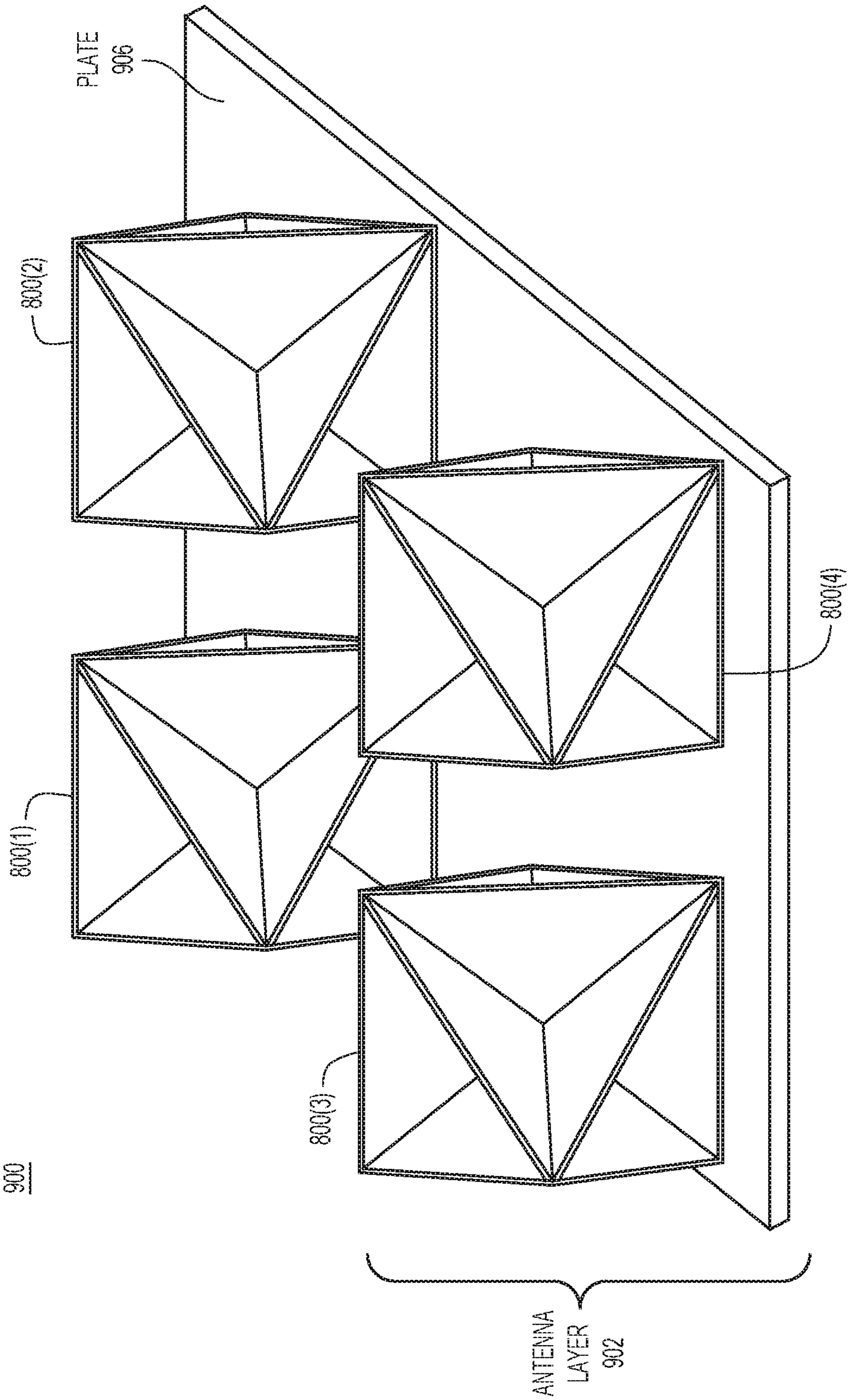
FIG. 9 is a perspective view of an example planar antenna array of PCB triaxial antennas.

With reference to FIG. 9, there is a perspective view of an example planar (2D) antenna array 900 including a single antenna layer 902. Antenna array 900 may incorporate triaxial antennas 102, 102(*i*), and 706 in systems 100, 600, and 700, respectively. Antenna layer 902 includes a layer of 4 PCB triaxial antennas 800(1)-800(4) extending in a planar direction mounted on a square, flat plate 906 also extending in the planar direction. Plate 906 is made of an RF transparent material, such as fiberglass. Triaxial antennas 800(1)-800(4) are arranged/placed relative to each other to form respective corners of a square that lies in a plane parallel to plate 906. That is, triaxial antennas 800(1)-800(4) are equally spaced (e.g., with spacings ranging from a half wavelength down to a quarter-wavelength of the RF energy to be received or transmitted) from each other in orthogonal directions atop plate 906. Thus, planar antenna array 900 is configured as a two-dimensional (2D) lattice/rectangular array of triaxial antennas 800(1)-800(4). The respective planes in which the 3 PCBs 802(1)-802(3) of each triaxial antenna 800(*i*) lie may be oriented randomly with respect to the plane of plate 906, i.e., one of the 3 PCBs may be parallel to the plate, or none of the 3 PCBs may be parallel to the plate. When planar (2D) antenna array 900 is deployed with a receive system, e.g., receive system 600, electrical leads 806(*i*) (i.e., the RF feeds) of each triaxial antenna 800(*i*) are connected to x, y, and z input terminals of downconverters 104*x*, 104*y*, and 104*z* of RF downconverter/digitizer assembly 104(*i*). The RF feeds may include ferrite beads at regular intervals (less than ¼ of a wavelength apart) to break up common mode electrical current and minimize RF coupling, so that the feed lines appear RF transparent.

Figure 10:
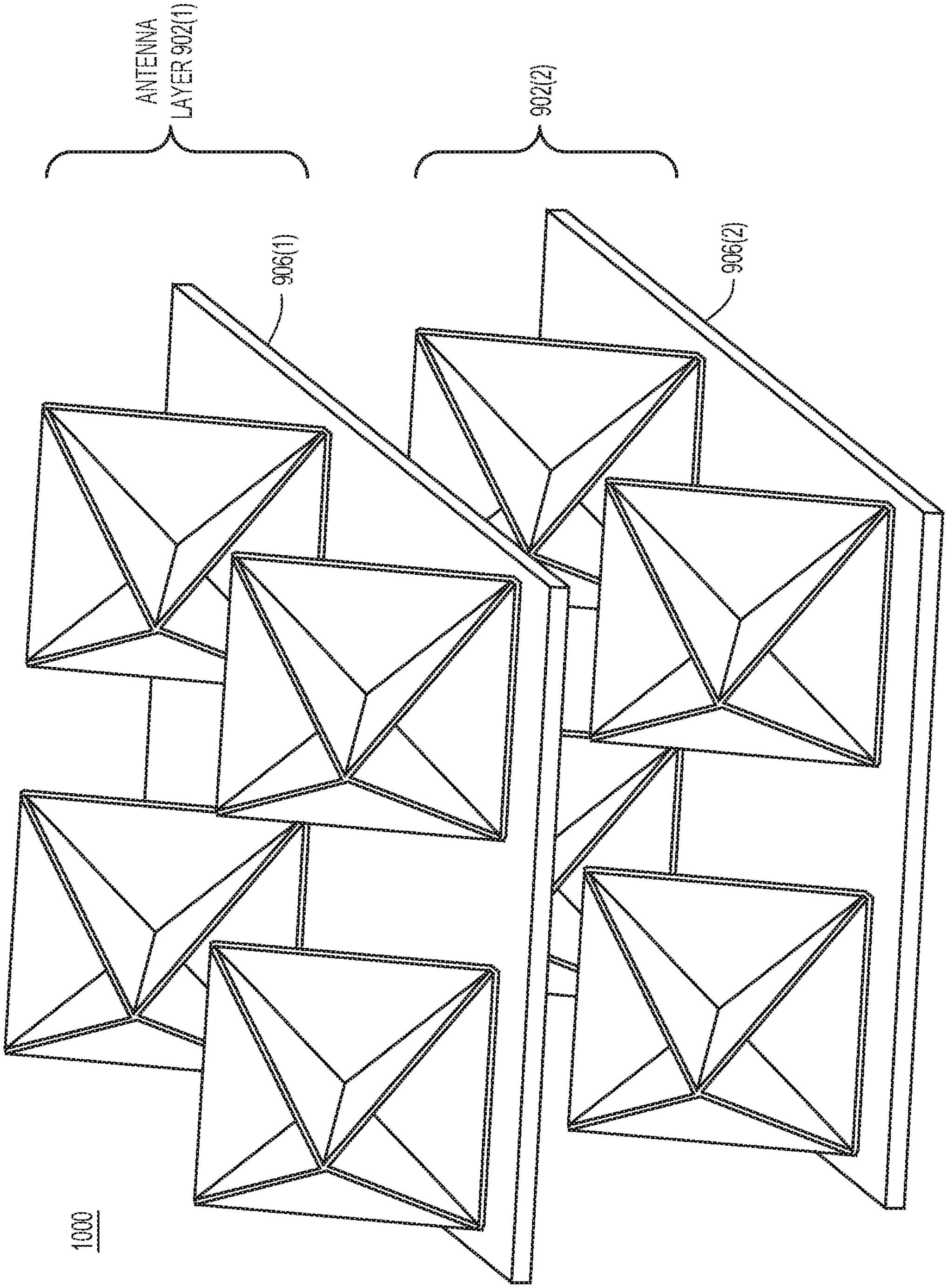
FIG. 10 is an illustration of an example volume array, including stacked planar antenna arrays, of PCB triaxial antennas.

With reference to FIG. 10, there is an illustration of an example volume (3D) antenna array 1000, including multiple antenna layers, e.g., antenna layers 902(1) (including a first set of 4 PCB triaxial antennas mounted atop plate 906(1)) and 902(2) (including a second set of 4 PCB triaxial antennas mounted atop plate 906(2)), each configured similarly to planar antenna layer 902 for antenna array 900 described above in connection with FIG. 9, stacked one on top of the other in the vertical direction, as depicted in FIG. 10. Thus, volume (3D) antenna array 1000 represents a 3D lattice of triaxial antennas. Volume (3D) antenna array 1000 can be used for unfurlable space-based arrays to make better use of available volume. Examples of volume (3D) antenna arrays include: 8 antenna elements arranged in a cube (2×2×2) as shown in FIG. 10; more generally, a M×M×M cubical array having $N=M^3$ antenna elements; and other spatial configurations.

Controller

Figure 11:
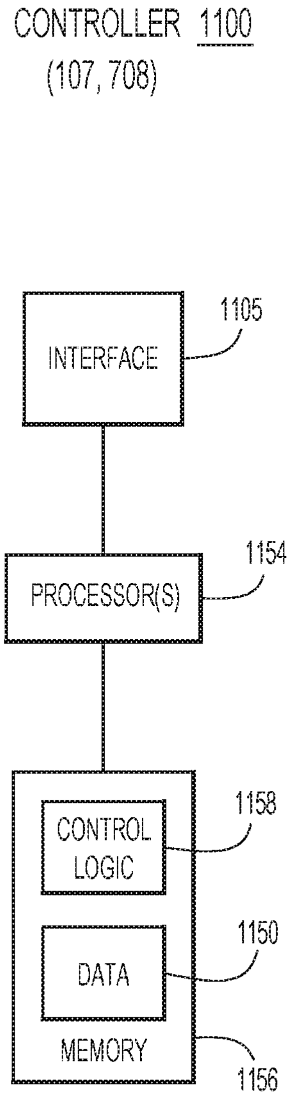
FIG. 11 is a block diagram of an example controller for the systems of FIGS. 1A, 6A, and 7A.

With reference to FIG. 11, there is a block diagram of an example controller 1100 representative of controller 107 or 708. Controller 1100 includes an interface 1105 through which the controller receives combined complex signals (e.g., combined complex signal 122 or 620) and correlation results (e.g., correlation results 124), and provides/outputs complex weights W_xi, W_yi, W_zi and angle signals AZ, EL for receive system 100, complex weights W_xi, W_yi, W_zi and the angle signals for transmit system 700, and complex weights W_i, the angle signals, and nulling complex weights Wa_i for receive system 600. Controller 1100 also includes a processor 1154 (or multiple processors, which may be implemented as software or hardware processors), and memory 1156.

Memory 1156 stores instructions for implementing methods described herein. Memory 1156 may include read only memory (ROM), random access memory (RAM), magnetic disk storage media devices, optical storage media devices, flash memory devices, electrical, optical, or other physical/tangible (non-transitory) memory storage devices. The processor 1154 is, for example, a microprocessor or a microcontroller that executes instructions stored in memory. Thus, in general, the memory 1156 may comprise one or more tangible computer readable storage media (e.g., a memory device) encoded with software comprising computer executable instructions and when the software is executed (by the processor 1154) it is operable to perform the operations described herein. For example, memory 1156 stores control logic 1158 to perform operations for methods 150, 200, 300, 500, 650, and 750. The memory 1156 may also store data 1160 used and generated by logic 1158, as described herein.

Complex Multiplier

Figure 12:
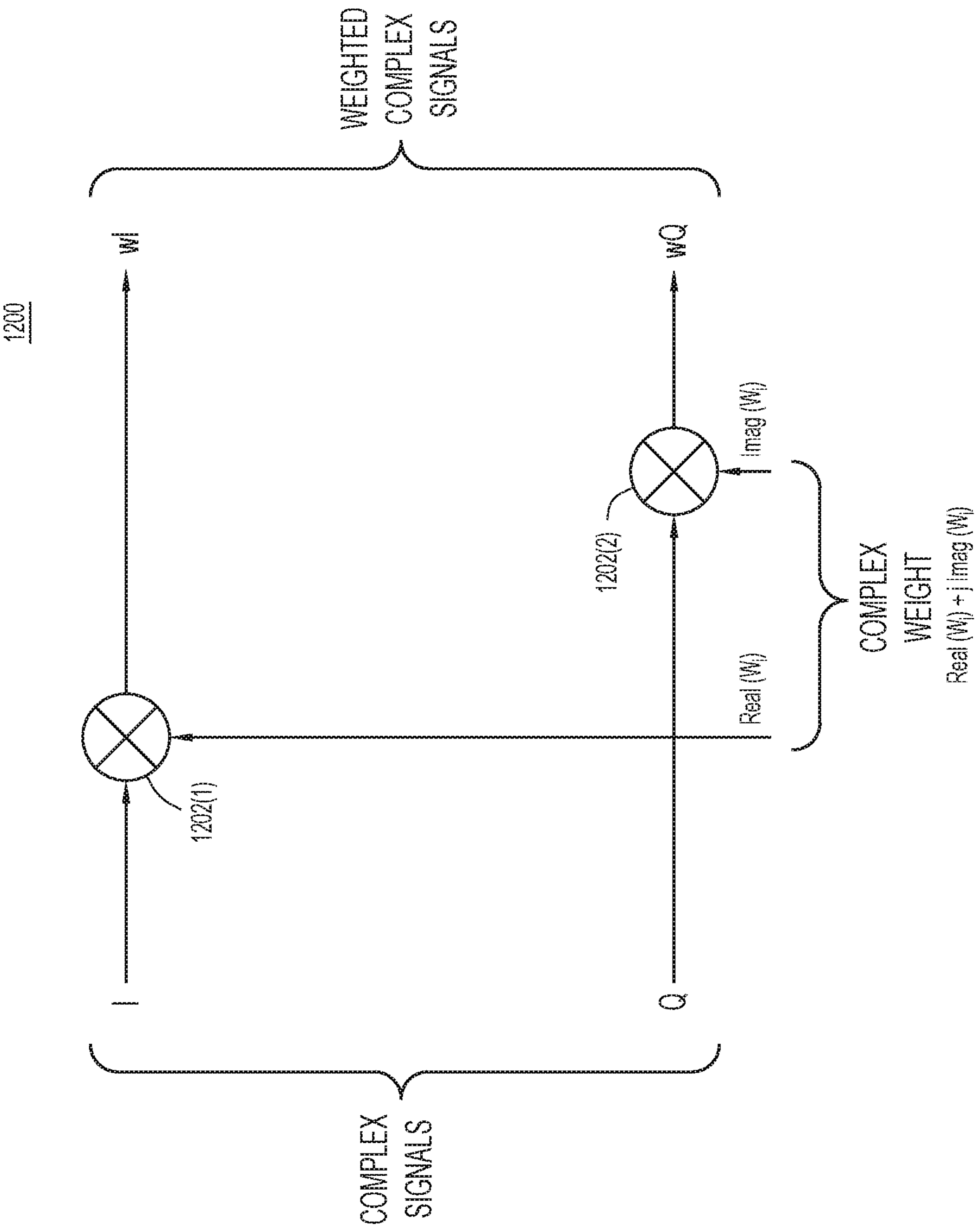
FIG. 12 is an illustration of an example complex multiplier used in the receive systems and the transmit system.

FIG. 12 is an illustration of an example complex multiplier 1200 used in the receive systems and transmit system described above. Complex multiplier 1200 includes individual multipliers 1202(1) and 1202(2) to receive I, Q signals/samples (i.e., quadrature signals, spaced by 90°) and multiply the I, Q signals by complex weights R, I, (e.g., real and imaginary components of complex weight W_xi) to produce weighted complex signals/samples wI, wQ.

Quadrature Upconverter-Modulator

Figure 13:
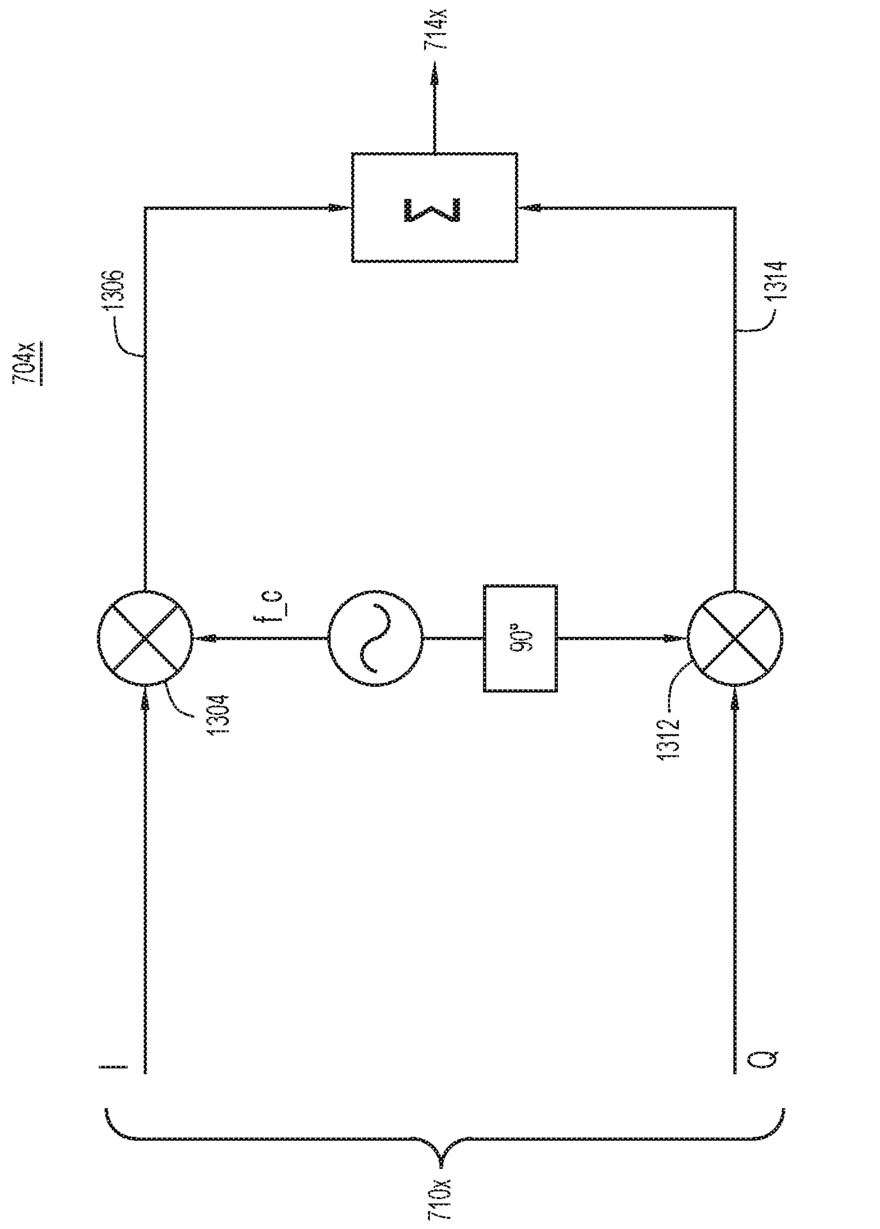
FIG. 13 is an illustration of an example quadrature upconverter-modulator used in the transmit system.

With reference to FIG. 13, there is an illustration of quadrature upconverter-modulator 704*x*, according to an embodiment. Quadrature upconverter-modulator 704*x* is configured and operates similarly to the other quadrature upconverter-modulators 704*y* and 704*z*. Quadrature upconverter-modulator 704*x* includes a mixer 1304 to frequency-upconvert a baseband signal I to a frequency-upconverted weighted signal 1306 based on a local oscillator frequency f_c. Quadrature upconverter-modulator 704x also includes a mixer 1312 to frequency-upconvert a baseband signal Q to a frequency-upconverted weighted signal 1314 based on a 90° shifted (i.e., quadrature) version of local oscillator frequency f_c. Quadrature upconverter-modulator 704x also includes a summer 1320 to sum signals 1306 and 1314 into RF modulated signal 714x.

Advantages and features of the embodiments presented herein including the following. The embodiments: open GPS transmission/reception from 2D to 3D, thus providing an additional degree of freedom; provide the ability to resolve signals in 3D space for both DOA and polarization characteristics, for superior anti jam and anti-spoofing; enable spatial modulation—a new class of digital modulation, which encodes information based on phase, polarization, and three dimensional direction. Also, triaxial antenna elements can be used to form a spatial array for which the antenna elements are packet into a 3D volume. The spatial array utilizes receive signal power from all of the antenna elements to electronically beam steer any desired polarization in any direction. For GPS, multiple navigation codes can be simultaneously transmitted/received in different directions by applying different x, y, and z weights to each TX or RX code.

Non-limiting summaries of embodiments presented herein are provided below. In the summaries below, labels "x," "y," and "z," are synonymous with and may be replaced by labels "first," "second," and "third," respectively.

Triaxial Receive Processing

A method comprising: at orthogonal x, y, and z linearly polarized elements of a triaxial antenna, converting received radio frequency (RF) energy to x, y, and z RF signals, respectively; converting the x, y, and z RF signals to x, y, and z complex signals referenced to x, y, and z axes, respectively; rotating the x, y, and z axes associated with the x, y, and z complex signals angularly responsive to angle signals, and applying x, y, and z complex weights to the x, y, and z complex signals, to produce x, y, and z controlled complex signals referenced to the x, y, and z axes as rotated, respectively, and summing the x, y, and z controlled complex signals into a combined signal, such that the x, y, and z complex weights apply a polarization to the RF energy as manifested in the combined signal, and the angle signals rotate a plane of the polarization relative to the x, y, and z axes, without moving the triaxial antenna.

A method comprising: at orthogonal 3D (i.e., triaxial) linearly polarized elements of a triaxial antenna, converting received radio frequency (RF) energy to 3D RF signals; converting the 3D RF signals to 3D complex signals referenced to 3D axes; rotating the 3D axes associated with the 3D complex signals angularly responsive to angle signals, and applying 3D complex weights to the 3D complex signals, to produce 3D controlled complex signals referenced to the 3D axes as rotated, and summing the 3D controlled complex signals into a combined signal, such that the 3D complex weights apply a polarization to the RF energy as manifested in the combined signal, and the angle signals rotate a plane of the polarization relative to the 3D axes, without moving the triaxial antenna.

An apparatus comprising: a triaxial antenna including orthogonal x, y, and z linearly polarized elements to convert radio frequency (RF) energy to x, y, and z RF signals, respectively; converters to convert the x, y, and z RF signals to x, y, and z complex signals referenced to x, y, and z axes, respectively; a polarization generator to rotate the x, y, and z axes of the x, y, and z complex signals angularly responsive to angle signals, apply x, y, and z complex weights to the x, y, and z complex signals to produce x, y, and z controlled complex signals referenced to the x, y, and z axes as rotated, respectively, and sum the x, y, and z controlled complex signals into a combined signal, such that the x, y, and z complex weights apply a polarization to the RF energy as manifested in the combined signal, and the angle signals rotate a plane of the polarization relative to the x, y, and z axes, without moving the triaxial antenna.

Detect Polarization

The apparatus may include a controller that sequences the x, y, and z complex weights through different sets of the x, y, and z complex weights to sequence the polarization through the different polarizations, measure energies of the combined signal corresponding to respective ones of the different polarizations, determine a maximum measured energy among the measured energies, and identify as a polarization of the RF energy the polarization among the different polarizations corresponding to the maximum measured energy.

Detect Direction of Arrival

The controller may sequence the angle signals through different sets of the angle signals to rotate the polarization plane through different directions relative to the x, y, and z orthogonal axes, measure energies of the combined signal corresponding to respective ones of the different directions, determine a maximum measured energy among the measured energies, and selects the direction among the different directions corresponding to the maximum measured energy as the different direction from which the RF energy is received.

Reject Directional Interferer (Jammer)

The triaxial antenna may receive, concurrently with the RF energy, undesired RF energy from an undesired direction, and the controller may control the angle signals to point a normal axis of the plane of polarization in a direction that is orthogonal to the undesired direction, so that an edge of the plane of polarization is aligned with the undesired direction.

Array Receive Processing—Polarization with Antenna Nulling

An apparatus comprising: an array of triaxial antenna elements each respectively including orthogonal three-dimensional (3D) linearly polarized elements to convert radio frequency (RF) energy to a respective set of 3D RF signals, respectively; frequency downconverters each to convert a respective one of the sets of 3D RF signals to a respective set of 3D complex signals; polarization generators each to apply to a respective one of the sets of 3D complex signals a respective polarization, and to rotate a plane of the polarization, to produce from the respective set of 3D complex signals a respective combined complex signal that represents the respective polarization as rotated; multipliers each to weight a respective one of the combined complex signals with a respective nulling complex weight, to produce a respective weighted combined complex signal; and a summer to combine the respective weighted combined complex signals into a final combined complex signal that represents the respective polarizations and a result of an antenna null formed in a receive pattern of the array responsive to the respective nulling complex weights.

To apply the respective polarization, each polarization generator may be configured to apply to the respective one of the sets of 3D complex signals a respective set of 3D polarization complex weights that cause the respective polarization.

To rotate the plane of polarization, each polarization generator may be configured to rotate the plane of polarization responsive to angle signals.

The apparatus may also include a controller to control the polarization, the rotation of the plane of polarization, and the respective nulling complex weights.

A method comprising: at an array of triaxial antenna elements each respectively including orthogonal three-dimensional (3D) linearly polarized elements, converting radio frequency (RF) energy received at the 3D linearly polarized elements to a respective set of 3D RF signals, respectively; converting each of the sets of 3D RF signals to a respective set of 3D complex signals; apply to each of the sets of 3D complex signals a respective polarization, and rotating a plane of the polarization, to produce from the respective set of 3D complex signals a respective combined complex signal that represents the respective polarization as rotated; weighting each of the combined complex signals with a respective nulling complex weight, to produce a respective weighted combined complex signal; and combining the respective weighted combined complex signals into a final combined complex signal that represents the respective polarizations and a result of an antenna null formed in a receive pattern of the array responsive to the respective nulling complex weights.

Triaxial Transmit Processing

An apparatus comprising: a polarization generator to receive first and second signals, apply to the first and second signals two-dimensional (2D) complex weights to produce 2D weighted complex signals that represent a polarization having a plane of polarization referenced to three-dimensional (3D) orthogonal axes, operate on the 2D weighted complex signals to rotate the plane of polarization angularly with respect to the 3D orthogonal axes, and produce 3D controlled complex signals representing the polarization with the rotated plane of polarization; quadrature upconverter-modulators to modulate the 3D controlled complex signals, to produce 3D modulated radio frequency (RF) signals; and a triaxial antenna including orthogonal 3D linearly polarized elements to receive respective ones of the 3D modulated RF signals and collectively convert the 3D modulated RF signals to radiant RF energy that has the polarization with the rotated plane of polarization.

A method comprising: receiving first and second signals; applying to the first and second signals two-dimensional (2D) complex weights to produce 2D weighted complex signals that represent a polarization having a plane of polarization referenced to three-dimensional (3D) orthogonal axes, operating on the 2D weighted complex signals to rotate the plane of polarization angularly with respect to the 3D orthogonal axes, and, as a result of the applying and the operating, producing 3D controlled complex signals that represent the polarization with the rotated plane of polarization; modulating the 3D controlled complex signals to produce 3D modulated radio frequency (RF) signals; and at orthogonal 3D linearly polarized elements of a triaxial antenna, receiving respective ones of the 3D modulated RF signals and collectively converting the 3D modulated RF signals to radiant RF energy that has the polarization with the rotated plane of polarization.

A method comprising: receiving first and second signals; applying to the first and second signals x and y complex weights to produce x and y weighted complex signals, respectively, that represent a polarization having a plane of polarization referenced to x, y, and z orthogonal axes, operating on the x and y weighted complex signals to rotate the plane of polarization angularly with respect to the x, y, and z axes, and, as a result of the applying and the operating, producing x, y, and z controlled complex signals that represent the polarization with the rotated plane of polarization; modulating the x, y, and z controlled complex signals to produce x, y, and z modulated radio frequency (RF) signals; and at orthogonal x, y, and z linearly polarized elements of a triaxial antenna, receiving respective ones of the x, y, and z modulated RF signals and collectively converting the x, y, and z modulated RF signals to radiant RF energy that has the polarization with the rotated plane of polarization.

Antenna Configurations

An antenna array comprising: one or more antenna layers each extending in a planar direction, each antenna layer including: a rigid flat plate of radio frequency (RF) transparent material extending in the planar direction; and a layer of triaxial antenna elements fixed to the flat plate, each triaxial antenna respectively including first, second, and third orthogonal linearly polarized elements (e.g., dipoles), the first, second, and third orthogonal linearly polarized elements each electrically connected to a respective RF feed to carry an RF signal to or from the linearly polarized element, the layer of triaxial antenna elements arranged to form a two-dimensional (2D) rectangular array of the triaxial antenna elements in which the triaxial antenna elements are equally space from each other in at least one dimension of the 2D rectangular array.

The one or more antenna layers may include multiple antenna layers each extending in the planar direction and stacked one on top of the other in a vertical direction orthogonal to the planar direction, such that the multiple antenna layers have a cuboid form factor, and the triaxial antenna elements of the multiple antenna layers are arranged to form a three-dimensional (3D) antenna array of triaxial antenna elements.

Each triaxial antenna may further include first, second, and third printed circuit boards (PCBs) to carry the first, second, and third orthogonal linearly polarized elements, respectively, wherein the first, second, and third PCBs lie in orthogonal planes.

The first, second, and third PCBs may each be rectangular in shape and have a middle portion, such that the PCBs are arranged in a crisscross fashion to intersect one another along their middle portions.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:

at orthogonal x, y, and z linearly polarized elements of a triaxial antenna, converting received radio frequency (RF) energy to x, y, and z RF signals, respectively;

converting the x, y, and z RF signals to x, y, and z complex signals referenced to x, y, and z axes, respectively; and rotating the x, y, and z axes associated with the x, y, and z complex signals angularly responsive to angle signals, and applying x, y, and z complex weights to the x, y, and z complex signals, to produce x, y, and z controlled complex signals referenced to the x, y, and z axes as rotated, respectively, and summing the x, y, and z controlled complex signals into a combined signal, such that the x, y, and z complex weights apply a polarization to the RF energy as manifested in the combined signal, and the angle signals rotate a plane of the polarization relative to the x, y, and z axes, without moving the triaxial antenna.

2. The method of claim 1, wherein the polarization is among different polarizations that are possible based on the x, y, and z complex weights.

3. The method of claim 2, wherein the different polarizations include linear polarization and elliptical polarization.

4. The method of claim 1, wherein the rotating includes operating on the x, y, and z complex signals to rotate the x, y, and z axes in one or more of azimuth and elevation responsive to an azimuth signal and an elevation signal among the angle signals, respectively.

5. The method of claim 1, further comprising:

controlling the x, y, and z complex weights to apply the polarization; and controlling the angle signals to rotate the plane of polarization in any direction relative to the x, y, and z axes without moving the triaxial antenna.

6. The method of claim 5, wherein:

the controlling the x, y, and z complex weights includes controlling the x, y, and z complex weights to create the polarization as linear polarization that lies in the plane of polarization; and the controlling the angle signals results in rotating the plane of polarization in one or more of azimuth and elevation.

7. The method of claim 5, wherein:

the controlling the x, y, and z complex weights includes controlling the x, y, and z complex weights to create the polarization as circular polarization; and the controlling the angle signals results in rotating the plane of polarization in one or more of azimuth and elevation.

8. The method of claim 1, further comprising:

sequencing the x, y, and z complex weights through different sets of the x, y, and z complex weights to sequence the polarization through different polarizations;

measuring energies of the combined signal corresponding to respective ones of the different polarizations;

determining a maximum measured energy among the measured energies; and identifying as a polarization of the RF energy the polarization among the different polarizations corresponding to the maximum measured energy.

9. The method of claim 1, further comprising:

sequencing the angle signals through different sets of the angle signals to steer the plane of polarization in different directions relative to the x, y, and z orthogonal axes, respectively;

measuring energies of the combined signal corresponding to respective ones of the different directions;

determining a maximum measured energy among the measured energies; and select the direction among the different directions corresponding to the maximum measured energy as the direction from which the RF energy is received.

10. The method of claim 1, wherein:

the x, y, and z linearly polarized elements are configured to receive, concurrently with the RF energy, undesired RF energy from an undesired direction; and the method further comprises controlling the angle signals to point a normal axis of the plane of polarization in a direction that is orthogonal to the undesired direction, so that an edge of the plane of polarization is aligned with the undesired direction.

11. The method of claim 10, wherein:

the undesired RF energy is circularly polarized and is manifested in the combined signal as linearly polarized energy as a result of the edge of the plane of polarization being aligned with the undesired direction; and the method further comprises subtracting the linearly polarized energy from the combined signal.

12. The method of claim 1, further comprising:

subtracting from energy having a plane of polarization lying in an x-y plane noise energy having a polarization aligned with the z axes.

13. An apparatus comprising:

a triaxial antenna including orthogonal x, y, and z linearly polarized elements to convert radio frequency (RF) energy to x, y, and z RF signals, respectively;

converters to convert the x, y, and z RF signals to x, y, and z complex signals referenced to x, y, and z axes, respectively; and a polarization generator to rotate the x, y, and z axes of the x, y, and z complex signals angularly responsive to angle signals, apply x, y, and z complex weights to the x, y, and z complex signals to produce x, y, and z controlled complex signals referenced to the x, y, and z axes as rotated, respectively, and sum the x, y, and z controlled complex signals into a combined signal, such that the x, y, and z complex weights apply a polarization to the RF energy as manifested in the combined signal, and the angle signals rotate a plane of the polarization relative to the x, y, and z axes, without moving the triaxial antenna.

14. The apparatus of claim 13, wherein the polarization is among different polarizations that are possible based on the x, y, and z complex weights.

15. The apparatus of claim 14, wherein the different polarizations include linear polarization and elliptical polarization.

16. The apparatus of claim 13, wherein to rotate the x, y, and z axes, the polarization generator is configured to operate on the x, y, and z complex signals to rotate the x, y, and z axes in one or more of azimuth and elevation responsive to an azimuth signal and an elevation signal among the angle signals, respectively.

17. The apparatus of claim 13, further comprising a controller to:

control the x, y, and z complex weights to apply the polarization; and control the angle signals to rotate the plane of polarization in any direction relative to the x, y, and z axes without moving the triaxial antenna.

18. The apparatus of claim 17, wherein the controller is configured to:

control the x, y, and z complex weights to create the polarization as linear polarization that lies in the plane of polarization; and control the angle signals to rotate the plane of polarization in one or more of azimuth and elevation.

19. The apparatus of claim 17, wherein the controller is configured to:

control the x, y, and z complex weights to create the polarization as circular polarization; and control the angle signals to steer rotate the plane of polarization in any one or more of azimuth and elevation.

20. The apparatus of claim 13, further comprising a controller to:

sequence the x, y, and z complex weights through different sets of the x, y, and z complex weights to sequence the polarization through different polarizations;

measure energies of the combined signal corresponding to respective ones of the different polarizations;

determine a maximum measured energy among the measured energies; and identify as a polarization of the RF energy the polarization among the different polarizations corresponding to the maximum measured energy.

* * * * *